US010138901B2

(12) United States Patent
Benson et al.

(10) Patent No.: US 10,138,901 B2
(45) Date of Patent: Nov. 27, 2018

(54) SYSTEMS AND METHODS FOR IMPLEMENTING A FAN ARRAY WITH QUICK CONNECT AND MODULAR CONTROL

(75) Inventors: David E. Benson, West Linn, OR (US); Brian James Motland, Sherwood, OR (US); Matthew Alan Gassaway, Portland, OR (US); Robert Techam, Chaska, MN (US)

(73) Assignee: Nortek Air Solutions, LLC, O'Fallon, MO (US)

( * ) Notice: Subject to any disclaimer, the term of this patent is extended or adjusted under 35 U.S.C. 154(b) by 1917 days.

(21) Appl. No.: 13/052,848

(22) Filed: Mar. 21, 2011

(65) Prior Publication Data

US 2012/0244015 A1  Sep. 27, 2012

(51) Int. Cl.
*F04D 29/60* (2006.01)
*F04D 25/16* (2006.01)

(52) U.S. Cl.
CPC ......... *F04D 29/601* (2013.01); *F04D 25/166* (2013.01)

(58) Field of Classification Search
CPC ...... F04D 25/166; F04D 19/002; F04D 25/16; F04D 27/004; F04D 29/646; F04D 29/601
USPC ..... 417/2–5, 32, 42, 44.1, 44.2, 44.3, 44.11, 417/45, 360, 423.5, 423.15, 423.14
See application file for complete search history.

(56) References Cited

U.S. PATENT DOCUMENTS

| 4,466,341 | A | * | 8/1984 | Grogan | 454/61 |
|---|---|---|---|---|---|
| 4,487,363 | A | * | 12/1984 | Parker et al. | 236/49.3 |
| 4,767,262 | A | * | 8/1988 | Simon | 415/119 |
| 5,422,550 | A | * | 6/1995 | McClanahan et al. | 318/91 |
| 5,492,082 | A | * | 2/1996 | Krevinghaus et al. | 119/448 |
| 5,586,861 | A | * | 12/1996 | Berger | 415/118 |
| 5,661,263 | A | | 8/1997 | Salvaggio | |
| 5,835,005 | A | * | 11/1998 | Furukawa et al. | 370/400 |
| 6,236,564 | B1 | * | 5/2001 | Fan | 361/695 |
| 6,592,449 | B2 | | 7/2003 | Cippola | |
| 6,693,531 | B2 | * | 2/2004 | Grauer | 340/506 |
| 6,790,257 | B2 | * | 9/2004 | Jeng et al. | 95/19 |
| 6,791,836 | B2 | * | 9/2004 | Cipolla et al. | 361/679.48 |
| 7,179,046 | B2 | * | 2/2007 | Hopkins | 415/61 |
| 7,527,468 | B2 | | 5/2009 | Hopkins | |
| 7,558,061 | B2 | | 7/2009 | Franz | |
| 7,633,250 | B2 | * | 12/2009 | Sato | 318/268 |
| 7,845,183 | B2 | * | 12/2010 | Singh et al. | 62/181 |

(Continued)

OTHER PUBLICATIONS

International Search Report and Written Opinion for counterpart PCT/US2012/023924, dated Sep. 5, 2012.

*Primary Examiner* — Essama Omgba
*Assistant Examiner* — Charles W Nichols
(74) *Attorney, Agent, or Firm* — Schwegman Lundberg & Woessner, P.A.

(57) ABSTRACT

A fan array is provided having a frame including a plurality of frame members. The frame members are joined to define a plurality of chambers. Each of a plurality of fan units is configured to be positioned in one of the plurality of chambers. Each fan unit has a motor. A plurality of local motor controllers are joined to corresponding motors. The local motor controllers are configured to control an operation of the corresponding fan unit. A master controller is configured to communicate with the local motor controllers. The master controller is configured to provide the local motor controllers with target operating parameters for the corresponding fan units.

77 Claims, 16 Drawing Sheets

(56) References Cited

U.S. PATENT DOCUMENTS

| | | |
|---|---|---|
| 8,814,639 B1 * | 8/2014 | Mecozzi .................. 454/238 |
| 2003/0089515 A1 * | 5/2003 | Federspiel et al. ............ 174/48 |
| 2008/0063548 A1 * | 3/2008 | Fujioka .................. 417/423.14 |
| 2010/0231042 A1 * | 9/2010 | Weale ............................ 307/38 |

\* cited by examiner

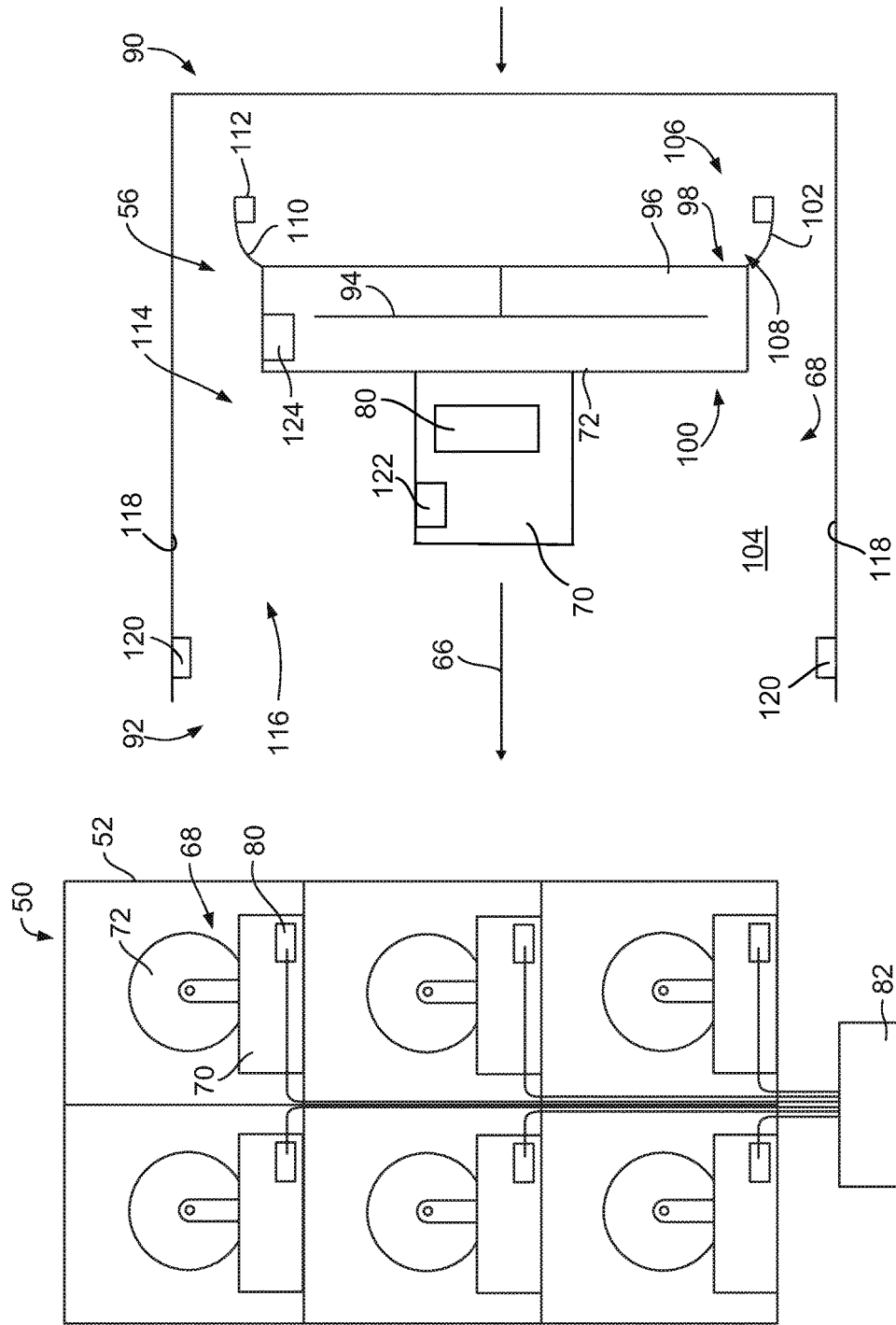

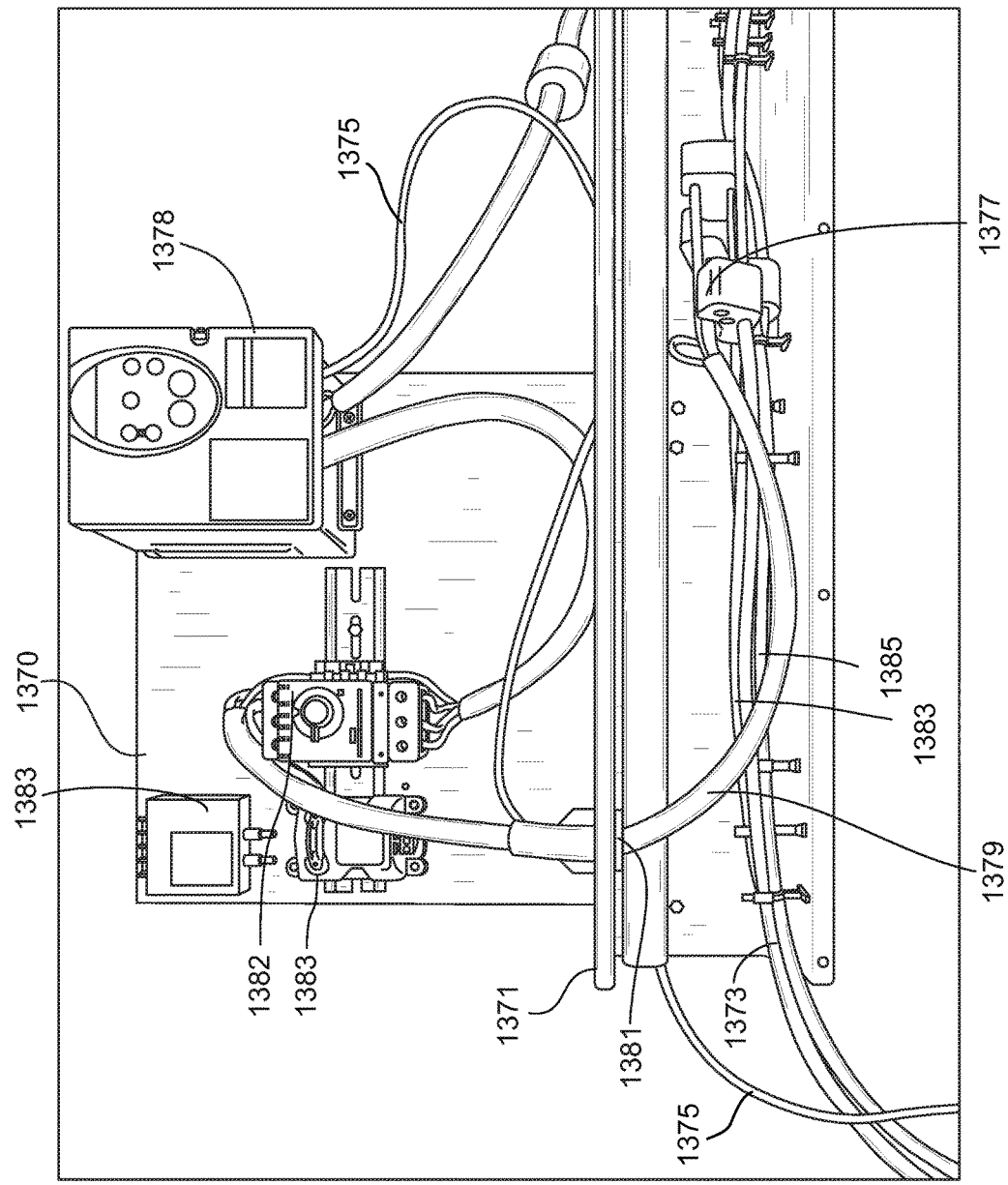

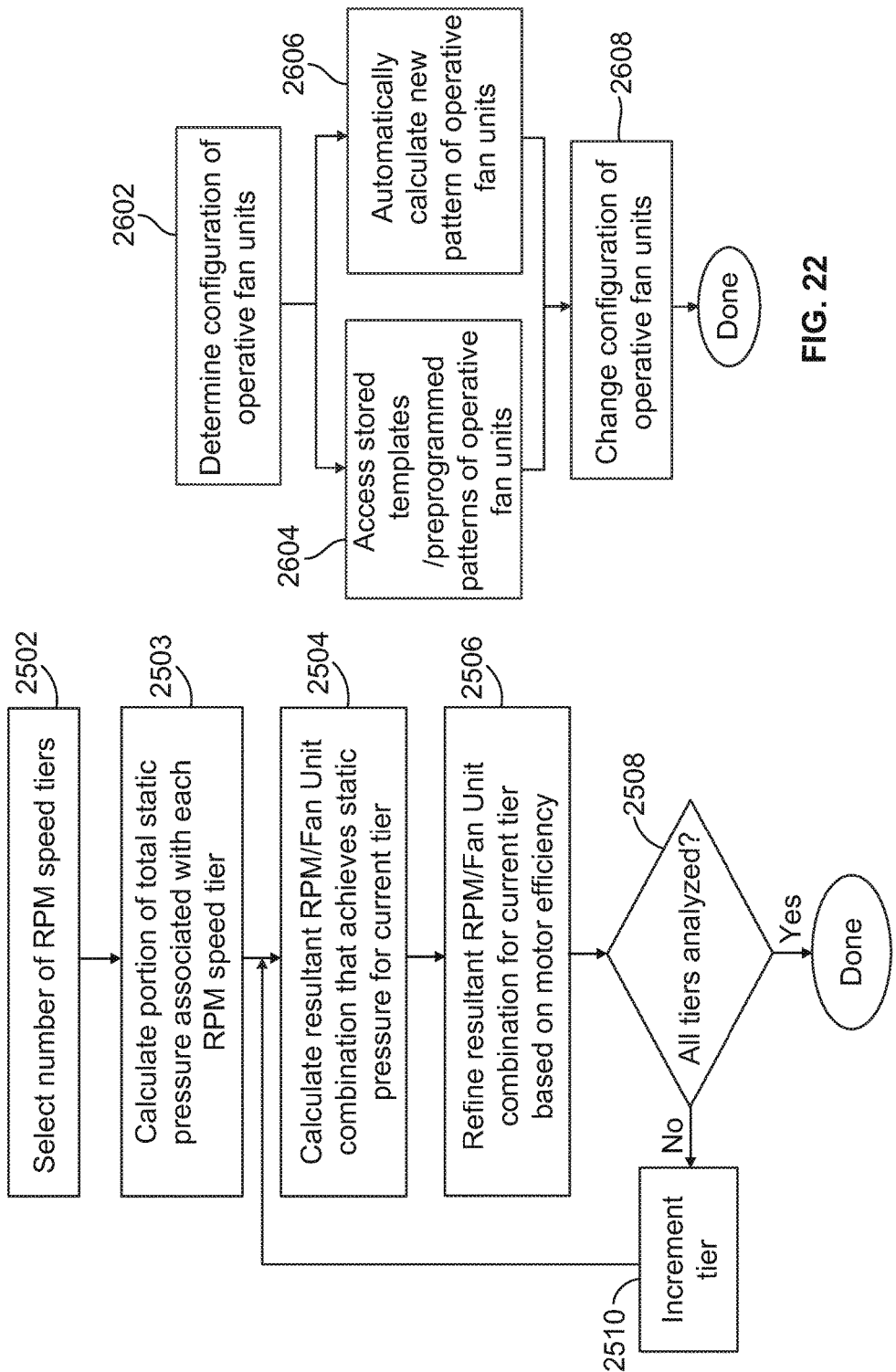

SYSTEMS AND METHODS FOR IMPLEMENTING A FAN ARRAY WITH QUICK CONNECT AND MODULAR CONTROL

BACKGROUND

The subject matter described herein relates to fan units and, more particularly, to systems and methods for implementing a fan array.

Fan arrays generally include a fan array frame and a plurality of fan units positioned within the frame. The fan units are positioned in individual chambers formed in the fan array frame. The fans units operate concurrently to provide air flow for an air handling unit, for example an HVAC unit. The fans direct an air stream into a plenum that carries the air stream through the air handling unit. Utilizing a plurality of fans may optimize the efficiency of the air handling unit. The fan units may operate in unison to provide the air stream throughout the air handling unit. Alternatively, the fan units may be individually controlled based on an overall performance of the air handling unit. In some fan arrays, individual fans may be shut off based on the performance of the air handling unit.

However, conventional fan arrays are not without their disadvantages. For example, the fan units of many fan arrays are not individually operable based on the performance of the individual fan unit. Rather, the fan units are operated based on the performance of the fan array as a whole. Accordingly, the fan array is required to make frequent adjustments to each fan unit to achieve a desired performance level. Such operation may be inefficient and create wear on the fan units. Wear on the fan units may eventually cause damage to and/or a malfunction in the fan array.

Moreover, conventional fan arrays may be difficult to assemble and maintain. In particular, inserting and removing a fan unit from the fan array may require a substantial amount of time. Most conventional fan arrays are not easily maintained because the fan units are difficult to remove from the fan array frame. Additionally, conventional fan arrays typically include a significant number of wires that are required to power each fan unit. Specifically, each fan unit may have to be plugged into a power system that is remote from the fan array frame. The fan units may also include data and communication wires that are plugged into systems and/or modules that are remote from the fan array. The wires may clutter the fan array, thereby increasing the difficulty of assembling and maintaining the fan array.

A need remains for a fan array that allows individual control of each fan unit based on the performance of the individual fan unit. Another need remains for a fan array that allows quicker assembly and maintenance.

SUMMARY OF THE INVENTION

In one embodiment, a fan array is provided having a frame including a plurality of frame members. The frame members are joined to define a plurality of chambers. Each of a plurality of fan units is configured to be positioned in one of the plurality of chambers. Each fan unit has a motor. A plurality of local motor controllers are joined to corresponding motors. The local motor controllers are configured to control an operation of the corresponding fan unit. A master controller is configured to communicate with the local motor controllers. The master controller is configured to provide the local motor controllers with target operating parameters for the corresponding fan units.

In another embodiment, a fan array is provided having a frame including a plurality of frame members. The frame members are joined to define a plurality of chambers. A signal path is joined to one of the frame members. The signal path has a plurality of outlets. Each of a plurality of fan units is configured to be positioned in one of the plurality of chambers. Each fan unit has a motor with a corresponding local motor controller that is configured to control an operation of the fan unit. The local motor controller configured to electrically couple to one of the outlets of the signal path. A master controller is electrically joined to signal path. The master controller provides to each local motor controller commands for each fan unit.

In another embodiment, a method of operating a fan array is provided. A plurality of fan units is positioned within chambers of a fan array frame. A corresponding local motor controller of each fan unit is electrically coupled to an outlet of a signal path provided on the fan array frame. A master controller is electrically coupled to the signal path. Commands for each fan unit are communicated between the master controller and the corresponding local motor controller.

In another embodiment, a method of operating a fan array is provided. A plurality of fan units is positioned within a chamber of a fan array frame. An operation of each fan unit is controlled with corresponding local motor controllers. Properties of air flow through each fan unit are detected with a sensor. Target operating parameters for each fan unit to the corresponding local motor controller is communicated from a master controller. A target speed for each fan unit is determined with the corresponding local motor controller based on the properties of the air flow through the fan unit and the target operating parameters.

BRIEF DESCRIPTION OF THE DRAWINGS

FIG. 2 is a back schematic view of the fan array shown in FIG. 1 and joined to a master controller.

FIG. 3 is a cross-sectional top view of a fan unit formed in accordance with an embodiment.

FIG. 4a is a back schematic view of a fan array formed in accordance with an alternative embodiment.

FIG. 4b is a cross-sectional view of a bus bar that may be used with the fan array shown in FIG. 4a.

FIG. 14b is a view of an alternative embodiment of the wire raceway shown in FIG. 14a.

FIG. 15b is a back view of a fan unit formed in accordance with an alternative embodiment.

FIG. 21 illustrates an algorithm for operating a fan array in accordance with an embodiment.

FIG. 22 illustrates an algorithm for operating a fan array in accordance with an embodiment.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
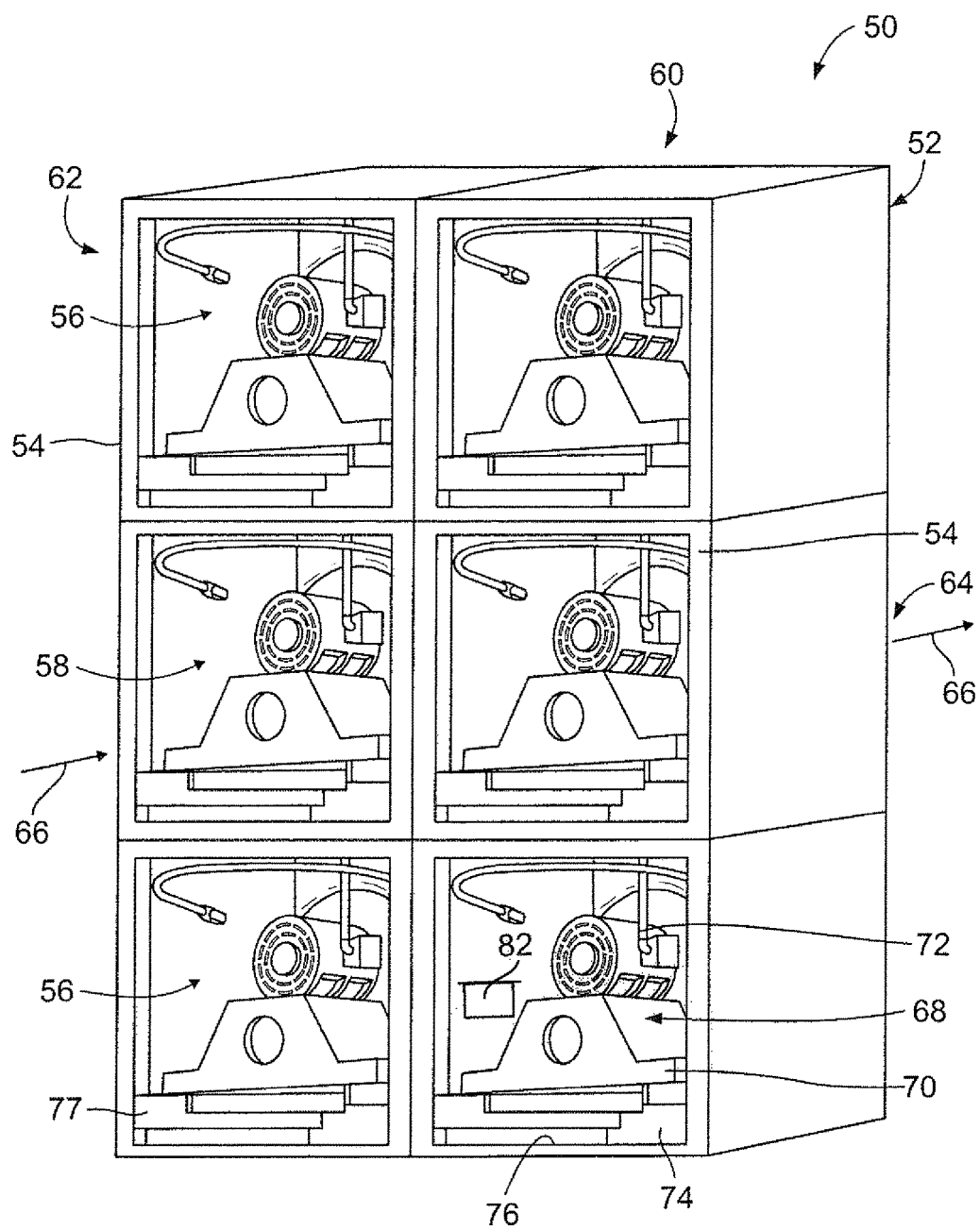
FIG. 1 is a back perspective view of a fan array formed in accordance with an embodiment.

FIG. 1 illustrates a fan array 50 formed in accordance with an embodiment. The fan array 50 includes a frame 52 formed from a plurality of frame members 54. The frame 52 has a front 60 and a back 62. The frame members 54 are joined to form chambers 56. The chambers 56 extend through the frame 52 from the front 60 to the back 62. The chambers 56 are illustrated in a 2 by 3 array. Optionally, the fan array 50 may include any suitable number of chambers 56. Each chamber 56 includes an outlet plenum 58. The outlet plenum 58 is positioned proximate to the back 62 of the frame 52. An inlet plenum 64 is positioned proximate to the front 60 of the frame 52. The outlet plenum 58 and/or the inlet plenum 64 may be covered with a mesh and/or wire screen configured to improve the safety of the fan array 50. An air stream 66 is configured to flow from the front 60 of the frame 52 to the back 62 of the frame 52. The air stream 66 flows into the outlet plenum 58 of each chamber 56 and is discharged from the inlet plenum 64 of the chamber 56.

The fan array 50 includes a plurality of fan units 68. Each fan unit 68 is retained within a separate chamber 56. Alternatively, multiple fan units 68 may be positioned within each chamber 56. The fan units 68 are configured to be inserted into a chamber 56 from the back 62 of the frame 52. In another embodiment, the fan units 68 are configured to be inserted into a chamber 56 from the front 60 of the frame 52. Each fan unit 68 includes a motor 70 and a fan 72 joined to the motor 70. The motor 70 may include a variable frequency drive. The motor 70 is joined to the frame 52 to secure the motor 70 within the chamber 56. The motor 70 may include integrated electronics. For example, the motor 70 may be an integrated DC motor. The motor 70 operates the fan 72 to channel the air stream 66 from the outlet plenum 58 to the inlet plenum 64 of the chamber 56.

In one embodiment, the fan units 68 are suspended within the chamber 56. An air relief passage 74 is formed between the fan unit 68 and a bottom 76 of the chamber 56. Alternatively, the fan unit 68 may be positioned on the bottom 76 of the chamber 56. The motor 70 may be coupled to the bottom 76 of the chamber 56. Optionally, the motor 70 may be joined to a motor mount 77 that is positioned on the bottom 76 of the chamber 56. In another embodiment, the fan unit 68 and the motor mount are suspended to form the air relief passage 74. The air relief passage 74 improves air flow around the fan units 68.

The chambers 56 may include one or more interior surfaces made from and/or lined with an acoustically absorptive material. Exemplary types of acoustically absorptive material include, but are not limited to traditional insulation board, such as boards formed from inorganic glass fibers, factory-applied foil-scrim-kraft, and/or a factory-applied all service jacket. Alternatively, the acoustically absorptive material may be formed from insulation, such as open cell foam.

FIG. 2 is a back view of the fan array 50. Each fan unit 68 includes a local motor controller 80. The local motor controller 80 may be a variable frequency drive. The local motor controller 80 is joined to the motor 70 of the fan unit 68. In another embodiment, the local motor controller 80 may be joined to the frame 52 of the fan array 50. The local motor controller 80 is electrically coupled to the fan unit 68. In one embodiment, the local motor controller 80 may be electrically coupled to more than one fan unit 68. In another embodiment, the local motor controller 80 may be wirelessly coupled to one or more fan units 68. The local motor controller 80 may include a processor and/or other integrated electronics.

The local motor controller 80 is configured to control the fan unit 68. The local motor controller 80 receives status inputs from the fan unit 68. The status inputs are indicative of current values of operating parameters for the fan unit 68. For example, the status inputs may include signals indicative of an air pressure through the fan unit 68, a speed of the fan 72, and/or a velocity of airflow through the fan unit 68. The status inputs may also include signals indicative of a power usage of the motor 70 and/or an amperage of the motor 70. In one embodiment, the status inputs may include signals indicative of motor efficiency, fan efficiency and/or an overall efficiency of the fan unit 68. The local motor controller 80 controls the fan unit 68 based on the status inputs. In one embodiment, each local motor controller 80 controls a respective fan unit 68 independent of the other fan units 68. Optionally, the local motor controller 80 may operate one or more of the fan units 68 based on the status inputs from the respective fan unit 68.

A master controller 82 is joined to the fan array 50. The master controller may be part of a master control unit including a user interface, a bus manager, and/or data buffers. The master controller 82 is not coupled to the fan array 50. The master controller 82 may be housed remotely in a separate room from the fan array 50. For example, the master controller 82 may be housed in a control center of a building in which the fan array 50 is located. Alternatively, the master controller 82 may be housed in a separate building from the fan array 50. In another embodiment, the master controller 82 may be coupled to the fan array frame 52. For example, the master controller 82 may be coupled a frame member 54 of the frame 52. In one embodiment, the master controller 82 may be located within a chamber 56 of the fan array 50. In another embodiment, the master controller 82 may be joined to one of the fan units 68. The master controller 82 is electrically coupled to each of the local motor controllers 80. Input related to the fan units 68 is delivered between the local motor controllers 80 and the master controller 82. In one embodiment, the input may be wirelessly transmitted between the local motor controllers 80 and the master controller 82.

The master controller 82 and the local motor controllers 80 are configured in a master/slave configuration. The master controller 82 receives the input from each local motor controller 80. The master controller 82 processes the input from each local motor controller 80 to determine instructions for each fan unit 68. For example, the master controller 82 may determine a target RPM speed for each fan unit 68. The target RPM speed for a fan unit 68 is based on the input from the fan unit 68. Alternatively, the target RPM speed for a fan unit 68 may be based on the input from all or a group of fan units 68. The master controller 82 delivers the instructions for each fan unit 68 to the respective fan unit 68. The fan units 68 are operated by the respective local motor controller 80 based on the instructions. The fan units 68 may be individually controlled, or controlled in groups.

The master controller 82 may transmit target motor parameter settings to the local motor controllers 80. The motor parameter settings may include RPM speed, power level, frequency and the like. Optionally, the master controller 82 may transmit target flow parameter settings to the local motor controllers 80. For example, the flow parameter settings may include target flow rate, target pressure and the like. The master controller 82 may transmit common target motor or flow parameter settings to all of the local motor controllers 80. Optionally, the master controller 82 may transmit a first set of target motor or flow parameter settings to a first set of local motor controllers and a different set of target motor or flow parameter settings to a second set of local motor controllers 80. Optionally, each local motor controller 80 may receive a different parameter setting.

The master controller 82 may store information, such as parameter settings, configuration commands, status requests, parameter settings, sensor values, operating data, or the like for each fan unit 68. The information is transmitted between the master controller 82 and the local motor controllers 80 to control the operation of the fan units 68. The information may be transmitted in data packets that are sent in serial or parallel. The information may be transmitted based on a predetermined communications protocol between the master controller 82 and the local motor controllers 80.

FIG. 3 is a cross-sectional top view of a fan unit 68 positioned within a chamber 56. The chamber 56 includes an upstream end 90 and a downstream end 92. The air stream 66 flows from the upstream end 90 to the downstream end 92. The motor 70 of the fan unit 68 is positioned at the downstream end 92 of the chamber 56. The fan 72 is positioned upstream from the motor 70. The fan 72 includes a fan blade 94 and a fan housing 96 that surrounds the fan blade 94. The fan blade 94 is joined to the motor 70. The motor 70 rotates the fan blade 94 within the fan housing 96. The fan housing 96 includes an upstream end 98 and a downstream end 100. An inlet cone 102 is coupled to the upstream end 98 of the fan housing 96 to direct the air stream 66 through the fan 72. A discharge cavity 104 is positioned at the downstream end 92 of the chamber 56. The air stream 66 discharged from the fan 72 flows through the discharge cavity 104 and exits the chamber 56.

The inlet cone 102 includes an upstream end 106 and a downstream end 108. The inlet cone 102 includes an inner surface 110 extending between the upstream end 106 and the downstream end 108. Inlet cone sensors 112 are positioned on the inner surface 110 of the inlet cone 102. The inlet cone sensors 112 may be embedded within the inlet cone 102. The inlet cone sensors 112 are positioned proximate to the upstream end 106 of the inlet cone 102. The inlet cone sensors 112 may be positioned proximate to the downstream end 108 of the inlet cone 102. In one embodiment, the inlet cone sensors 112 may be positioned at any intermediate location between the upstream end 106 and the downstream end 108 of the inlet cone 102. The illustrated embodiment includes two inlet cone sensors 112 positioned opposite one another. The inlet cone 102 may include any number of inlet cone sensors 112 positioned at any location along the inner surface 110 of the inlet cone 102.

The inlet cone sensors 112 detect flow related parameters of the air stream 66 flowing through the fan 72. For example, the inlet cone sensors 112 may detect a pressure and/or velocity of the air stream 66 at the inlet cone 102. In one embodiment, the inlet cone sensors 112 include local pressure sensors, temperature sensors, power draw sensors, vibration sensors, noise sensors and/or the like. The inlet cone sensors 112 deliver signals indicative of the flow related parameters to the local motor controller 80. The local motor controller 80 processes the parameter values and delivers input to the master controller 82 (shown in FIG. 2). Based on the parameter values, the master controller 82 operates the fan 72. The master controller 82 may utilize the parameter values to determine a target RPM speed for the fan 72.

The discharge cavity 104 includes an upstream end 114 and a downstream end 116. The discharge cavity 104 includes an inner surface 118 extending between the upstream end 114 and the downstream end 116. Discharge sensors 120 are positioned on the inner surface 118 of the discharge cavity 104. The discharge sensors 120 may be embedded within the discharge cavity 104. The discharge sensors 120 are positioned proximate to the downstream end 116 of the discharge cavity 104. The discharge sensors 120 may be positioned proximate to the upstream end 114 of the discharge cavity 104. In one embodiment, the discharge sensors 120 may be positioned at any intermediate location between the upstream end 114 and the downstream end 116 of the discharge cavity 104. The illustrated embodiment includes two discharge sensors 120 positioned opposite one another. The discharge cavity 104 may include any number of discharge sensors 120 positioned at any location along the inner surface 118 of the discharge cavity 104.

The discharge sensors 120 detect parameters of the air stream 66 flowing through the fan 72. The discharge sensors 120 may detect a pressure and/or velocity of the air stream 66 at the discharge cavity 104. In one embodiment, the discharge sensors 120 include local pressure sensors, temperature sensors, power draw sensors, vibration sensors, noise sensors and/or the like. The discharge sensors 120 deliver signals indicative of the air stream parameters to the local motor controller 80. The local motor controller 80 processes the signals and delivers input to the master controller 82. Based on the input, the master controller 82 operates the fan 72. The master controller 82 may utilize the input to determine a target RPM speed for the fan 72.

A motor sensor 122 is positioned on the motor 70. The motor sensor 122 detects parameters of the motor 70. For example, the motor sensor 122 may detect an amperage of the motor 70 and/or a power usage of the motor 70. In one embodiment, the motor sensor 122 includes local pressure sensors, temperature sensors, power draw sensors, vibration sensors, noise sensors and/or the like. The motor sensor 122 delivers input to the local motor controller 80 and the master controller 82. The master controller 82 determines instructions for the fan 72 based on the input. For example, the master controller 82 determines a target RPM speed for the fan 72 based on the input. The instructions are delivered to the local motor controller 80. The local motor controller 80 operates the fan unit 68 based on the instructions.

A fan sensor 124 is joined to the fan housing 96. Alternatively, the fan sensor 124 may be joined to the fan blade 94. The fan sensor 124 detects parameters of the fan 72, for example, fan speed. In one embodiment, the fan sensor 124 includes local pressure sensors, temperature sensors, power draw sensors, vibration sensors, noise sensors and/or the like. The parameters of the fan 72 are delivered to the local motor controller 80 and the master controller 82. The master controller 82 determines instructions, for example, a target RPM speed for the fan 72 based on the parameters.

Figures 4A, 4B:
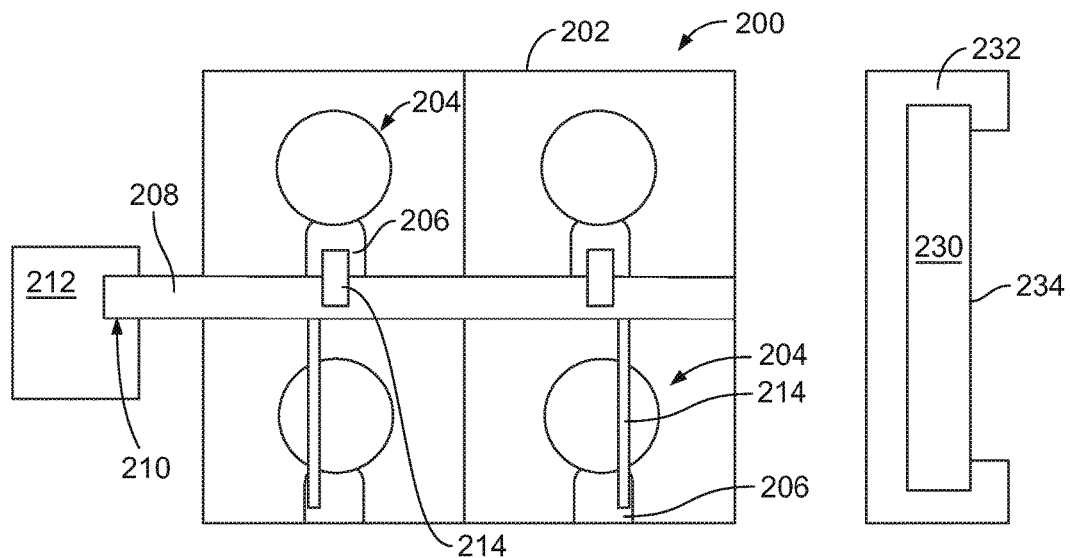

FIG. 4a illustrates a fan array 200 formed in accordance with an alternative embodiment and having a frame 202. A plurality of fan units 204 are positioned within the frame 202. Each fan unit 204 includes a local motor controller 206 joined thereto. The local motor controller 206 is configured to control the corresponding fan unit 204. A bus bar 208 extends across the frame 202. The bus bar 208 is a metal strip configured to carry electrical currents thereacross. The bus bar 208 may be fabricated from copper, aluminum, and/or any other suitable conductive material. An end 210 of the bus bar 208 is joined to a master controller 212. The master controller 212 directs electrical currents across the bus bar 208. Coupling members 214 extend between each local motor controller 206 and the bus bar 208. The coupling members 214 are formed from a conductive material, for example, copper, aluminum, or the like. The coupling members 214 may be bolted to the bus bar 208. Alternatively, the coupling members 214 may be clamped to the bus bar 208. The coupling members 214 are configured to direct electrical currents from the bus bar 208 to the corresponding local motor controller 206.

The master controller 212 directs a transmission across the bus bar 208. The transmission generally includes a high voltage, low frequency power signal. For example, the transmission may be a 110V signal having a 50-60 Hz frequency. The transmission is directed by the coupling members 214 to each local motor controller 206. The transmission is utilized to power the individual fan units 204. In one embodiment, the local motor controllers 206 may include a circuit breaker to shut off the flow of the transmission to the corresponding fan unit 204. Shutting off the flow of the transmission enables individual fan units 204 to be maintained or repaired without shutting off the remaining fan units 204.

In one embodiment, the master controller 212 is capable of impressing carrier signals onto the transmission. The carrier signals are generally high frequency signals, for example, signals within a range of 200 Hz-200 kHz. The carrier signals may include configuration commands, status requests, parameter settings, sensor values, or operating data complied into data packets. The carrier signals impressed onto the transmission are transmitted over the bus bar 208 with the high voltage power signal. The frequencies of the carrier signals have a frequency that is distinguishable from the low frequency power signal, thereby enabling the power signal and the carrier signal to be separated with a filter, for example, a band-pass filter. At the local motor controllers 206, the transmission passes through at least one filter to separate the low frequency power signal and the high frequency carrier signals. The power signal is utilized to convey power to the corresponding fan unit 204. The carrier signals may be directed to a processor or the like within the local motor controllers 206. The local motor controllers process the data packet to read the information therein. The local motor controllers utilize the data and commands in the data packet to control the corresponding fan unit 204. In one embodiment, the local motor controllers 206 may direct carrier signals back to the master controller 212. Such carrier signals may include data indicative of the operating parameters of the fan unit 204. The master controller 212 may use the data to generate additional commands and data to be delivered to the local motor controllers 206.

In one embodiment, each local motor controller 206 may have an individual address associated with the local motor controller 206. Accordingly, carrier signals delivered from the master controller 212 may include header information containing the address of at least one local motor controller 206. When the local motor controllers 206 the carrier signals from the transmission, the carrier signal may be read or ignored based on the intended recipient. Carrier signals may be addressed to individual fan units 204, groups of fan units 204, or the entire fan array 200.

FIG. 4b illustrates a cross-sectional view of a bus bar 230 formed in accordance with an embodiment. The bus bar 230 may be used with the fan array 200 illustrated in FIG. 4a. The bus bar 230 includes an insulative cover 232 extending therearound. The cover 232 protects operators of the fan array 200 from contacting the bus bar 230. A conductive surface 234 of the bus bar 230 is left uncovered and exposed. The conductive surface 234 is configured to face toward the fan array 200 and out of reach from an operator. The coupling members 214 are configured to be joined to the conductive surface 234 to electrically join the bus bar 230 to the local motor controllers 206.

Figure 5:
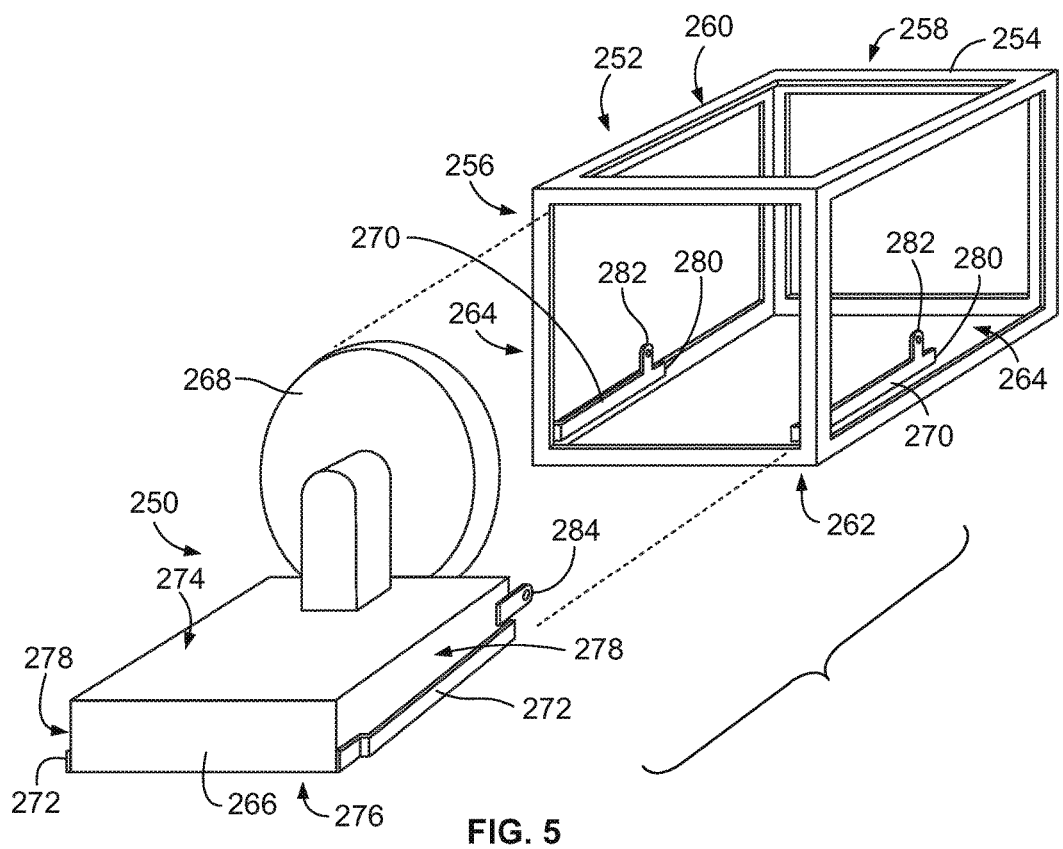
FIG. 5 is a side perspective view of a fan unit formed in accordance with an embodiment and being inserted into a fan array chamber formed in accordance with an embodiment.

FIG. 5 illustrates a fan unit 250 formed in accordance with an embodiment and being inserted into a fan array chamber 252 formed in accordance with an embodiment. The fan array chamber 252 is defined by a plurality of frame members 254. The fan array chamber 252 includes a back 256 and an opposite front 258. The fan array chamber 252 includes a top 260 and an opposite bottom 262. Sides 264 extend between the top 260 and the bottom 262. The sides 264 extend between the back 256 and the front 258.

The fan unit 250 includes a motor 266 and a fan 268 coupled to the motor 266. The fan unit 250 is configured to be inserted into the chamber 252. The fan unit 250 is inserted into the back 256 of the chamber 252. The fan unit 250 is configured to be positioned within the chamber 252 such that the motor 266 of the fan unit 250 is positioned proximate to the back 256 of the chamber 252 and the fan 268 is positioned proximate to the front 258 of the chamber 252.

The chamber 252 includes alignment mechanisms 270. The alignment mechanisms 270 may be rails, slots, protrusions, and/or the like. The alignment mechanisms 270 may include wheels, ball bearings and/or the like. The alignment mechanisms 270 are positioned proximate to the bottom 262 of the chamber 252. The alignment mechanisms 270 extend from the back 256 of the chamber 252. The alignment mechanisms 270 extend partially toward the front 258 of the chamber 252. The illustrated embodiment includes an alignment mechanism 270 on each side 264 of the chamber 252. Optionally, the chamber 252 may include an alignment mechanism 270 on only one of the sides 264. In one embodiment, the alignment mechanisms 270 may extend along the bottom 262 of the chamber 252 at intermediate locations between the sides 264.

The fan unit 250 includes attachment mechanisms 272 joined thereto. The attachment mechanisms 272 may be joined to the motor 266. The motor 266 includes a top 274 and an opposite bottom 276. Opposite sides 278 extend between the top 274 and the bottom 276 of the motor 266. The attachment mechanisms 272 are positioned proximate to the bottom 276 of the motor 266. Alternatively, the attachment mechanisms 272 may be positioned at any intermediate location between the top 274 and the bottom 276 of the motor 266. The attachment mechanisms 272 are positioned on the sides 278 of the motor 266. An attachment mechanism 272 may be positioned on only one side 278 of the motor 266. In another embodiment, the attachment mechanisms 272 may extend along the bottom 276 of the motor 266 at intermediate locations between the sides 278. The attachment mechanisms 272 may be rails, wheels, protrusions, slots, and/or the like. The attachment mechanisms 272 may include ball bearings.

The attachment mechanisms 272 of the fan unit 250 are configured to engage the alignment mechanisms 270 of the chamber 252 when the fan unit 250 is inserted into the chamber 252. The attachment mechanisms 272 slide along the alignment mechanisms 270 when the fan unit 250 is inserted into the chamber 252. In one embodiment, the attachment mechanisms 272 and/or the alignment mechanisms 270 may include a lubricant to enable the attachment mechanisms 272 to slide along the alignment mechanisms 270. In the illustrated embodiment, the alignment mechanisms 270 include a stop 280. The stop 280 limits movement of the fan unit 250 within the chamber 252. The stop 280 prevents the fan unit 250 from being positioned too close to the front 258 of the chamber 252. The alignment mechanism 270 and the stop 280 position the fan unit 250 within the chamber 252.

The alignment mechanisms 270 align the fan unit 250 within the chamber 252. The alignment mechanisms 270 limit time and energy required to position the fan unit 250 within the chamber 252. The alignment mechanisms 270 enable the fan unit 250 to be removed from the chamber 252 for maintenance and/or replacement.

The chamber 252 includes a latch 282 joined thereto. In the illustrated embodiment the latch 282 is joined to the alignment mechanism 270. The latch 282 is joined to the alignment mechanism 270 adjacent the stop 280. In one embodiment, the latch 282 may be joined to any location along the alignment mechanism 270. In another embodiment, the latch 282 may be joined to a frame member 254. The latch 282 may be joined to a frame member 254 at any location within the chamber 252. In another embodiment, the chamber 252 may include multiple latches 282 joined to the alignment mechanisms 270 and/or the frame members 254. Alternatively, the chamber 252 may not include the latch 282, but rather, the chamber 252 may include any other suitable coupling mechanism. The chamber 252 may include a combination of latches 282 and other coupling mechanisms.

The fan unit 250 includes an engagement mechanism 284. The engagement mechanism 284 corresponds to and is configured to couple to the latch 282 of the chamber 252. The engagement mechanism 284 is joined to the motor 266. Optionally, the engagement mechanism 284 may be joined to the fan 268 and/or the attachment mechanism 272. The engagement mechanism 284 is configured to align with the latch 282 when the fan unit 250 is inserted into the chamber 252. When the fan unit 250 is positioned within the chamber 252, the engagement mechanism 284 engages the latch 282. The latch 282 and the engagement mechanism 284 retain the fan unit 250 in the chamber 252. The latch 282 and the engagement mechanism 284 prevent the fan unit 250 from moving within the chamber 252. The engagement mechanism 284 can be released from the latch 282 to remove the fan unit 250 from the chamber 252.

Figure 6:
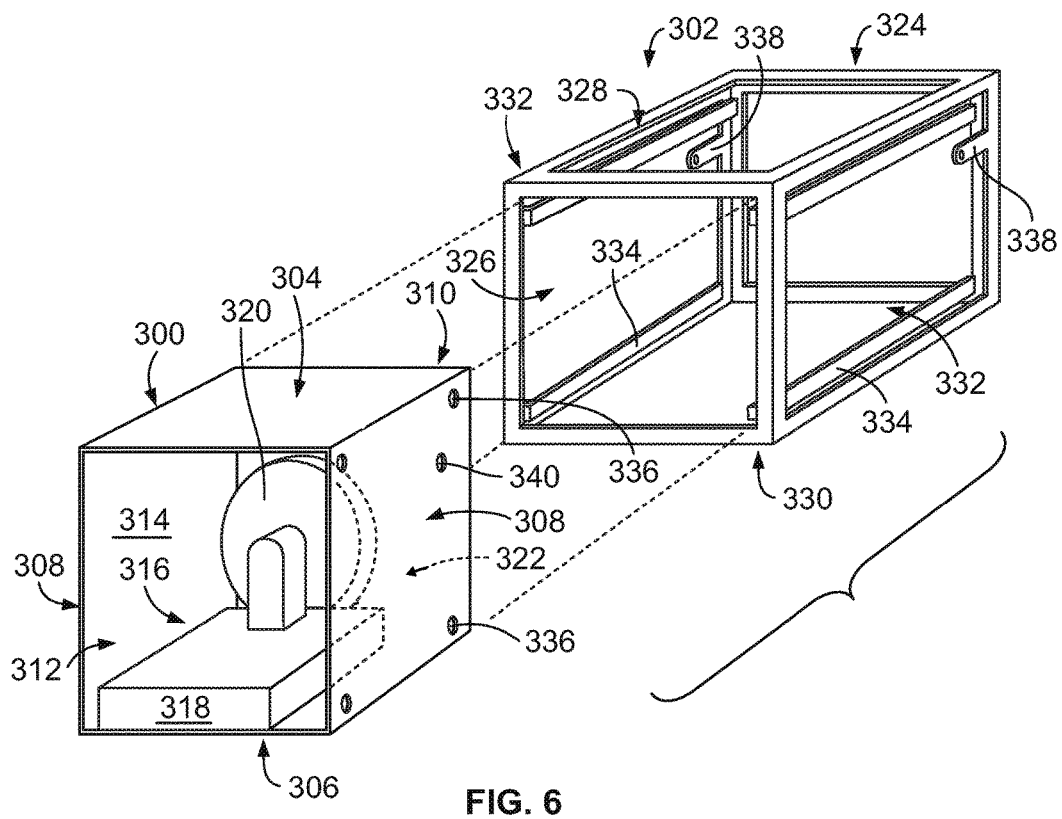
FIG. 6 is a side perspective view of a fan unit housing formed in accordance with an embodiment and being inserted into a fan array chamber formed in accordance with an embodiment.

FIG. 6 illustrates a fan unit housing 300 formed in accordance with an embodiment. The fan unit housing 300 is configured to be inserted into a fan array chamber 302 formed in accordance with an embodiment. The fan unit housing 300 includes a top 304 and an opposite bottom 306. Sides 308 extend between the top 304 and the bottom 306. The fan unit housing 300 includes a front 310 and a back 312. The front 310 and the back 312 are open to create an opening 314 through the fan unit housing 300. A fan unit 316 is positioned within the opening 314 of the fan unit housing 300. The fan unit 316 includes a motor 318 and a fan 320. A discharge cavity 322 extends from the fan 320. The motor 318 is positioned proximate to the back 312 of the fan unit housing 300. The discharge cavity 322 is positioned proximate to the front 310 of the fan unit housing 300.

The chamber 302 is formed from a plurality of frame members 301. The chamber 302 includes a front 324 and an opposite back 326. A top 328 and a bottom 330 extend between the front 324 and the back 326. Sides 332 extend between the front 324 and the back 326. The fan unit housing 300 is configured to be positioned within the chamber 302 such that the front 310 of the fan unit housing 300 is positioned proximate to the front 324 of the chamber 302. The back 312 of the fan unit housing 300 is configured to position proximate to the back 326 of the chamber 302.

The chamber 302 includes an alignment mechanism 334 joined thereto. The alignment mechanism 334 is configured as a rail. Alternatively, the alignment mechanism 334 may be a slot, a protrusion, wheels, or the like. Alignment mechanisms 334 are joined to the sides 332 of the chamber 302. The alignment mechanisms 334 are positioned proximate to the bottom 330 and the top 328 of the chamber 302. The alignment mechanisms 334 extend from the front 324 to the back 326 of the chamber 302. Optionally, the alignment mechanisms 334 may be joined at any intermediate location between the top 328 and the bottom 330 of the chamber 302. In another embodiment, alignment mechanisms 334 may extend along the bottom 330 of the chamber 302.

The fan unit housing 300 includes attachment mechanisms 336 joined thereto. The attachment mechanisms 336 are joined to the sides 308 of the fan unit housing 300. The attachment mechanisms 336 are joined proximate to the top 304 and the bottom 306 of the fan unit housing 300. Alternatively, the attachment mechanisms 336 may be joined to the fan unit housing 300 at any intermediate location between the top 304 and the bottom 306 of the fan unit housing 300. In one embodiment, the attachment mechanisms 336 extend along the bottom 306 of the fan unit housing 300.

The attachment mechanisms 336 are formed as wheels that are configured to roll along the alignment mechanisms 334 of the chamber 302. The attachment mechanisms 336 may be formed as any mechanism that corresponds to and engages the alignment mechanisms 334. The attachment mechanisms 336 are configured to align with the alignment mechanisms 334 when the fan unit housing 300 is positioned within the chamber 302. The attachment mechanisms 336 move along the alignment mechanisms 334 to position the fan unit housing 300 within the chamber 302.

The chamber 302 includes a latch 338. The fan unit housing 300 includes an engagement mechanism 340 that corresponds to the latch 338. The engagement mechanism 340 aligns with the latch 338. The engagement mechanism 340 is configured to engage the latch 338 when the fan unit housing 300 is positioned within the chamber 302. The engagement mechanism 340 and the latch 338 retain the fan unit housing 300 within the chamber 302. In one embodiment, the chamber 302 and the fan unit housing 300 may include any corresponding coupling mechanisms.

Figure 7:
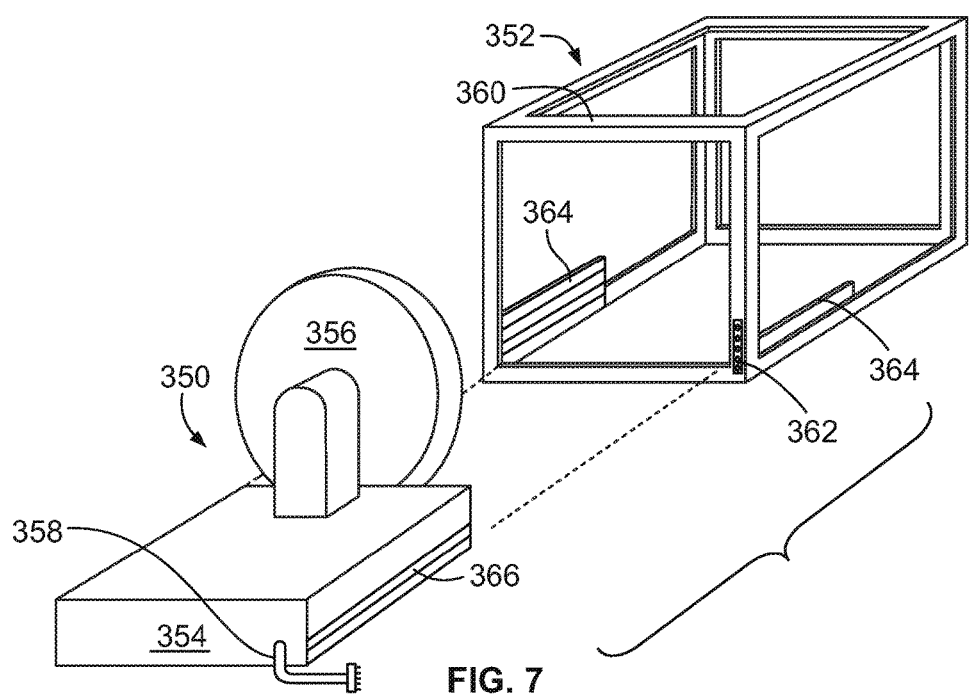
FIG. 7 is a side perspective view of another fan unit formed in accordance with an embodiment and being inserted into a fan array chamber formed in accordance with an embodiment.

FIG. 7 illustrates a fan unit 350 formed in accordance with an alternative embodiment. The fan unit 350 is configured to be inserted into a fan array chamber 352 formed in accordance with an embodiment. The fan unit 350 includes a motor 354 and a fan 356 joined to the motor 354. A cable 358 extends from the motor 354. The cable 358 may be a power and/or data connector. In another embodiment, the cable 358 may extend from a local motor controller (not shown) of the fan unit 350. The cable 358 is capable of transferring power and/or data signals therethrough. The cable 358 is capable of transmitting communications from the fan unit 350.

The chamber 352 is formed from a plurality of frame members 360. The chamber 352 includes an outlet 362 positioned thereon. The outlet 362 is joined to one of the frame members 360. The outlet 362 may be part of a bus bar (not shown) joined to the frame members 360. The outlet 362 may be a power and/or data outlet. The outlet 362 is configured to transfer power and/or data signals therethrough. The outlet 362 is capable of receiving and transmitting communication signals. The outlet 362 is configured to receive the cable 358 of the fan unit 350 when the fan unit 350 is inserted into the chamber 352.

The fan unit 350 is configured to align within the chamber 352 such that the cable 358 can be engaged with the outlet 362. The chamber 352 includes alignment mechanisms 364. The alignment mechanisms 364 include rails. Optionally, the alignment mechanisms 364 may include wheels, slots, protrusions or the like. The fan unit 350 includes attachment mechanisms 366 formed as rails. Alternatively, the attachment mechanisms 366 may be formed as wheels, slots, protrusions, or the like. The attachment mechanisms 366 are configured to correspond to the alignment mechanisms 364. The alignment mechanisms 364 and the attachment mechanisms 366 may include ball bearings and/or lubrication. The attachment mechanisms 366 slide along the alignment mechanisms 364 to position the fan unit 350 within the chamber 352. The fan unit 350 is positioned within the chamber 352 such that the cable 358 is positioned proximate to the outlet 362. The cable 358 is inserted into the outlet 362 to direct communication signals, power signals, and/or data signals between the fan unit 350 and a control device (not shown), for example, a master controller, a communications device, and/or a power device.

Figure 8:
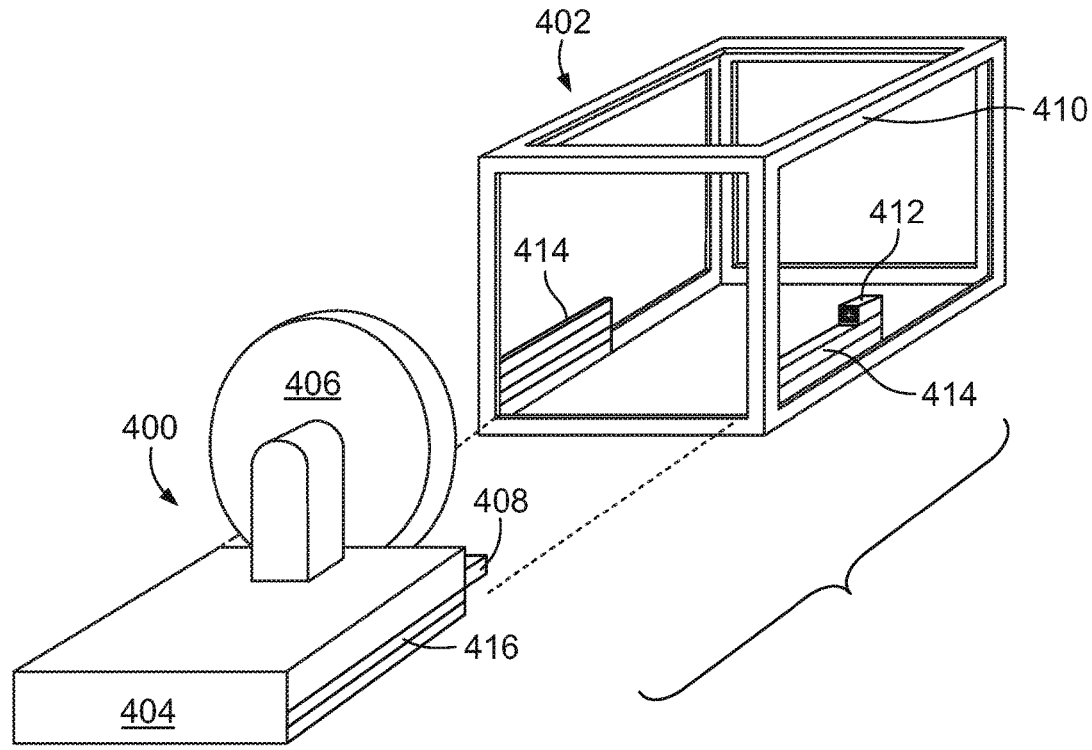
FIG. 8 is a side perspective view of another fan unit formed in accordance with an embodiment and being inserted into a fan array chamber formed in accordance with an embodiment.

FIG. 8 illustrates another fan unit 400 formed in accordance with an embodiment. The fan unit 400 is configured to be inserted into a fan array chamber 402 formed in accordance with an embodiment. The fan unit 400 includes a motor 404 and a fan 406 joined to the motor 404. A plug 408 extends from the motor 404. The plug 408 may be a power and/or data connector. In another embodiment, the plug 408 may extend from a local motor controller (not shown) of the fan unit 400. The plug 408 is capable of transferring power and/or data signals therethrough. The plug 408 is capable of transmitting communications from the fan unit 400.

The chamber 402 is formed from a plurality of frame members 410. The chamber 402 includes an outlet 412 extending from one of the frame members 410. The outlet 412 may be part of a bus bar (not shown) joined to the frame members 410. The outlet 412 may be a power and/or data outlet. The outlet 412 is configured to transfer power and/or data signals therethrough. The outlet 412 is capable of receiving and transmitting communication signals. The outlet 412 is configured to engage the plug 408 of the fan unit 400 when the fan unit 400 is inserted into the chamber 402.

The fan unit 400 is configured to align within the chamber 402 such that the plug 408 aligns with the outlet 412. The plug 408 is aligned with the outlet 412 so that the plug 408 engages the outlet 412 as the fan unit 400 is positioned within the chamber 402. The chamber 402 includes alignment mechanisms 414. The fan unit 400 includes attachment mechanisms 416. The attachment mechanisms 416 slide along the alignment mechanisms 414 to position the fan unit 400 within the chamber 402. The fan unit 400 is positioned within the chamber 402 such that the plug 408 engages the outlet 412. As the fan unit 400 slides into the chamber 402 the plug 408 is inserted into the outlet 412. Contacts within the plug 408 couple to contacts within the outlet 412 to create an electrical connection between the plug 408 and the outlet 412. The plug 408 engages the outlet 412 so that communication signals, power signals, and/or data signals can be conveyed between the fan unit 400 and a control device (not shown), for example, a master controller, a communications device, and/or a power device.

The example embodiment illustrates the plug 408 on the fan unit 400 and the outlet 412 within the chamber 402. Alternatively, the chamber 402 may include a plug that engages an outlet provided on the fan unit 400.

Figure 9:
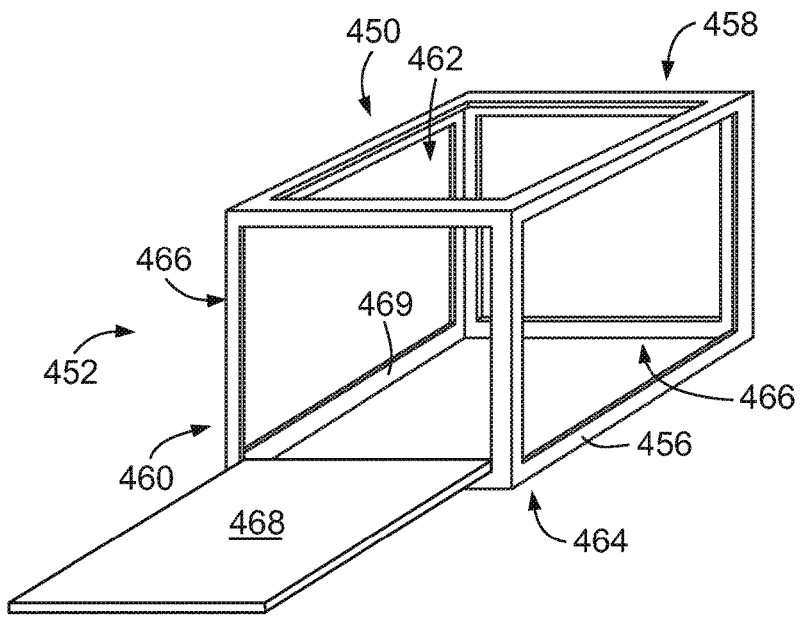
FIG. 9 is a side perspective view of a fan array chamber formed in accordance with an embodiment and in an open configuration.
Figure 10:
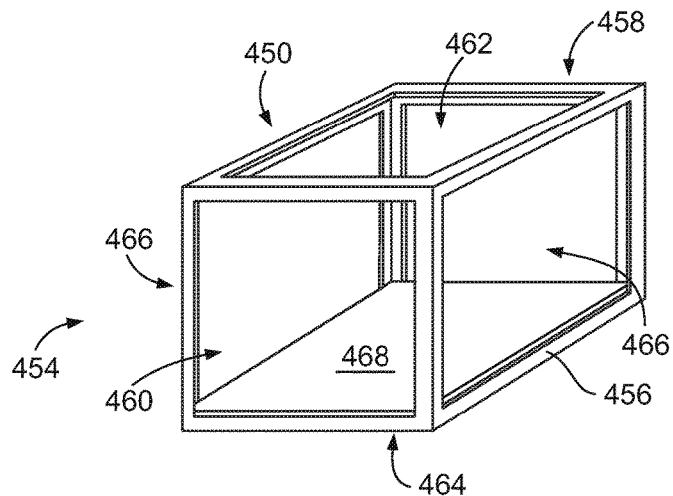
FIG. 10 is a side perspective view of the fan array chamber shown in FIG. 9 and in a closed configuration.

FIG. 9 illustrates a fan array fan array chamber 450 formed in accordance with an embodiment and in an open configuration 452. FIG. 10 illustrates the fan array fan array chamber 450 in a closed configuration 454. The fan array fan array chamber 450 is defined by a plurality of frame members 456. The fan array fan array chamber 450 includes a front 458 and an opposite back 460. A top 462 and a bottom 464 extend between the front 458 and the back 460. Sides 466 extend between the front 458 and the back 460.

The fan array chamber 450 includes a panel 468 positioned therein. The panel 468 is positioned proximate to the bottom 464 of the fan array chamber 450. The panel 468 is positioned on a track 469. The panel 468 is moveable along the track 469. The track 469 may include wheels to enable the panel 468 to move therealong. The panel 468 is moveable between the open configuration 452 (shown in FIG. 9) and the closed configuration 454 (shown in FIG. 10). In the open configuration 452 the panel 468 extends from the fan array chamber 450. The panel 468 extends from the back 460 of the fan array chamber 450. In the closed configuration 454 the panel 468 is positioned within the fan array chamber 450.

A fan unit (not shown) is configured to be positioned on the panel 468. The fan unit is positioned on the panel 468 when the panel 468 is in the open configuration 452. The panel 468 is moved into the closed configuration 454 to position the fan unit within the fan array chamber 450. The panel 468 can be moved back to the open configuration 452 to remove the fan unit, perform maintenance on the fan unit, and/or replace parts of the fan unit.

Figure 11:
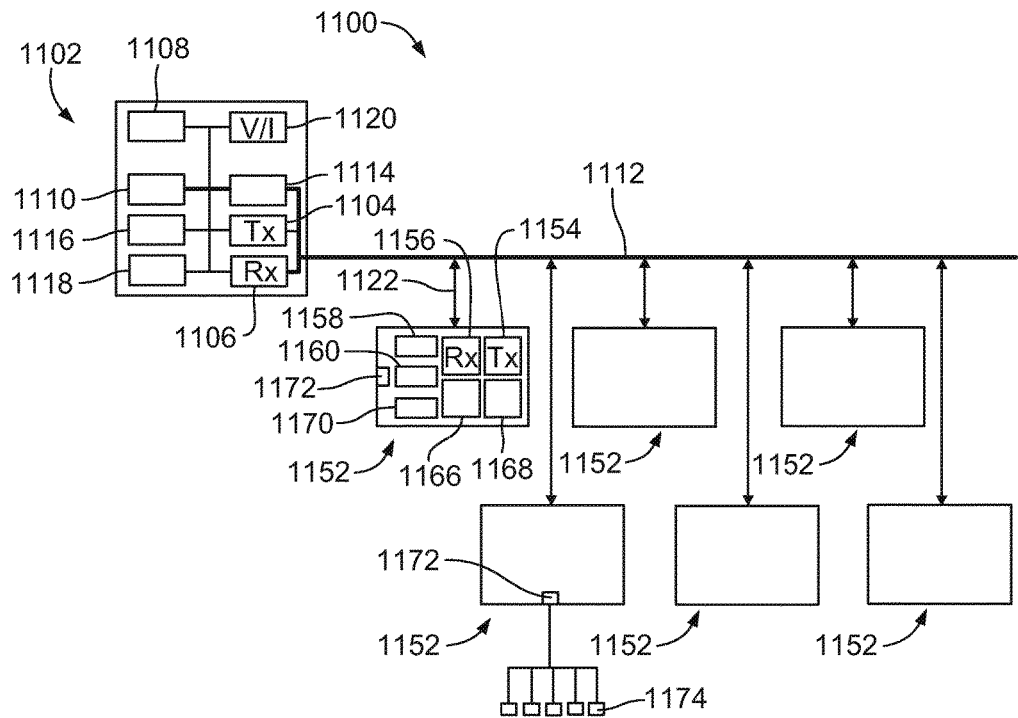
FIG. 11 is a block diagram of an exemplary master/slave bus management architecture formed in accordance with an embodiment.

FIG. 11 illustrates a block diagram of an exemplary master/slave bus management architecture formed in accordance with an embodiment of the present invention. In FIG. 11, a fan array control system 1100 is illustrated with a master control unit 1102 that is coupled to a plurality of fan units 1152 over a bus 1112 and individual fan unit communications links 1122.

The master control unit 1102 includes a master controller 1108 that performs overall management of communication to and from each of the fan units 1152, as well as determinations for individual fan unit parameter settings as explained throughout the present application. The master control unit 1102 includes memory 1110 that stores, among other things, operating parameter settings for the individual fan units 1152, sensor values and the like. A user interface 1120 allows user control over and programming of the master control unit 1102. A bus manager 1114 manages priorities and sequence of all traffic over the bus 1112. The traffic over the bus 1112 may include configuration commands, status requests, parameter settings, sensor values, operating data, and the like.

A transmitter 1104 transmits communications information over the bus 1112 to the fan units 1152. A receiver 1106 receives communications data from the bus 1112. The transmitter 1104 may access an outgoing data buffer 1116 for data, commands and other information to be transmitted over the bus 1112 to one or more fan units 1152. The receiver 1106 receives data, commands and other information from the bus 1112 and stores such information in the incoming data buffer 1118. The master controller 1108 and/or the bus manager 1114 may directly communicate with the transmitter and receiver 1104 and 1106, as well as directly access, load, erase, write to and read from the inbound and outbound data buffers 1116 and 1118. Among the other things, the memory manager 1115 may control the order the fan units 1152 communicate over the bus 1112. The transmitter 1104 and the receiver 1106 may communicate with the fan units 1152 in accordance with a predetermined communications protocol. The transmitter 1104 may insert commands, data and other information from the data buffer 1116 into data packets that are then transmitted over the bus 1112 in a serial or parallel manner. Data packets may include header information indicating whether one or more fan units 1152 are to receive an outgoing data packet. For example, the transmitter 1104 may include a unique ID associated with a particular fan unit when directing an individual packet to a specific fan unit. Alternatively, transmitter 1104 may add a more general header indicating that multiple or all of the fan units 1152 should access and operate upon an outgoing data packet.

Each fan unit 1152 includes components and functions in a similar manner, and thus the structure of only one fan unit is illustrated in detail and discussed below. Each fan unit 1152 includes a slave controller 1158, memory 1160, an incoming data buffer 1162, an outgoing data buffer 1168, a transmitter 1154, a receiver 1156, a local sensor queue 1170 and a data port 1172 to be coupled to individual sensors 1174. The slave controller 1158 manages operation of a corresponding fan unit 1152 in accordance with data, commands and other information stored locally in memory 1160. The transmitter and receiver 1154 and 1156 operate in accordance with the same communications protocol as transmitter and receiver 1104 and 1106 to receive and send data packets over the bus 1112. Incoming and outgoing data buffers 1166 and 1168 save data temporarily before being transmitted by transmitter 1154 or after being received by receiver 1156 prior to being locally processed by the slave controller 1158. The local sensors 1174 may represent local pressure sensors, temperature sensors, power draw sensors, vibration sensors, noise sensors and the like which provide corresponding sensor information through data ports 1172 to the local slave controller 1158.

During operation, the master control unit 1102 transmits operating parameters to each of the fan units 1152 and polls the fan units 1152 periodically for status information, sensor information, operating conditions and the like.

Figure 12:
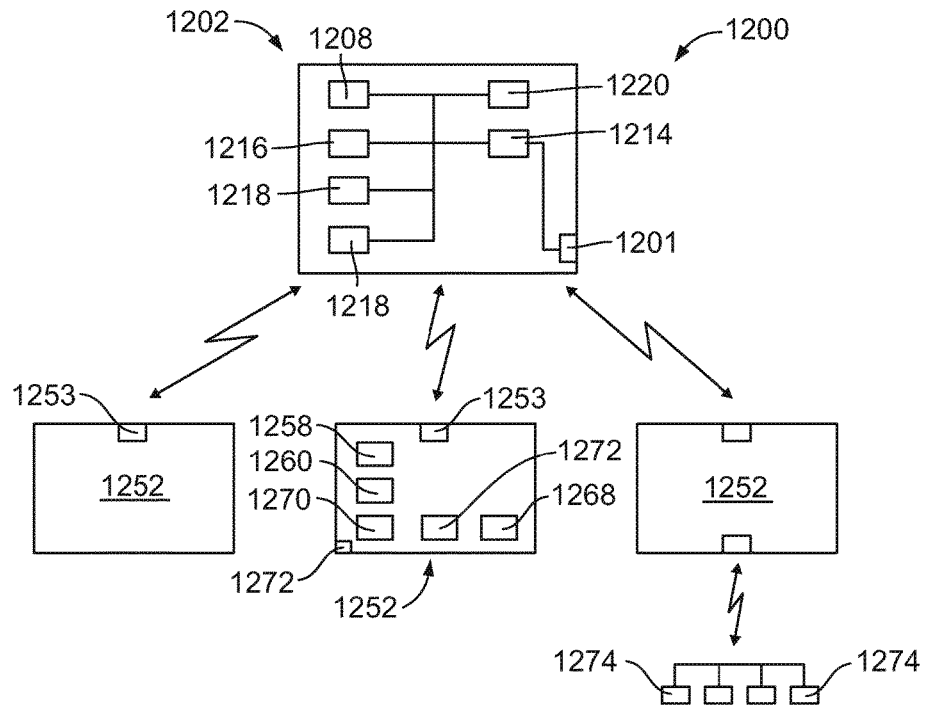
FIG. 12 is a block diagram of an exemplary wireless master/slave bus management architecture formed in accordance with an embodiment.

FIG. 12 illustrates a block diagram of an exemplary wireless master/slave architecture formed in accordance with an embodiment of the present invention. In FIG. 12, a fan array control system 1200 is illustrated with a master control unit 1202 that is in wireless communication with a plurality of fan units 1252. The master control unit 1202 includes a wireless transmitter/receiver 1201 that communicates with a wireless transmitter/receiver 1253 of the fan units 1252.

The master control unit 1202 includes a master controller 1208 that performs overall management of communication to and from each of the fan units 1252, as well as determinations for individual fan unit parameter settings as explained throughout the present application. A user interface 1220 allows user control over and programming of the master control unit 1202. A wireless manager 1214 manages priorities and sequence of all traffic over the wireless transmitter/receiver 1201. The wireless transmitter/receiver 1201 transmits communications information to the fan units 1252 and receives communications data from the fan units 1252. The transmitter/receiver 1201 may access an outgoing data buffer 1216 for data, commands and other information to be transmitted to one or more fan units 1252. The transmitter/receiver 1201 receives data, commands and other information and stores such information in the incoming data buffer 1218. The wireless manager 1214 may control the order the fan units 1252 communicate to the master control unit 1202. The wireless transmitter/receiver 1201 may insert commands, data and other information into data packets that are then transmitted in a serial or parallel manner.

Each fan unit 1252 includes components and functions in a similar manner, and thus the structure of only one fan unit is illustrated in detail and discussed below. Each fan unit 1252 includes a slave controller 1258, memory 1260, an incoming data buffer 1262, an outgoing data buffer 1268, the wireless transmitter/receiver 1201, a local sensor queue 1270 and a data port 1272 to be coupled to individual sensors 1274. The slave controller 1258 manages operation of a corresponding fan unit 1252 in accordance with data, commands and other information stored locally in memory 1260. The local sensors 1274 may represent local pressure sensors, temperature sensors, power draw sensors, vibration sensors, noise sensors and the like which provide corresponding sensor information through data ports 1272 to the local slave controller 1258.

During operation, the master control unit 1202 transmits operating parameters to each of the fan units 1252 and polls the fan units 1252 periodically for status information, sensor information, operating conditions and the like.

Figure 13:
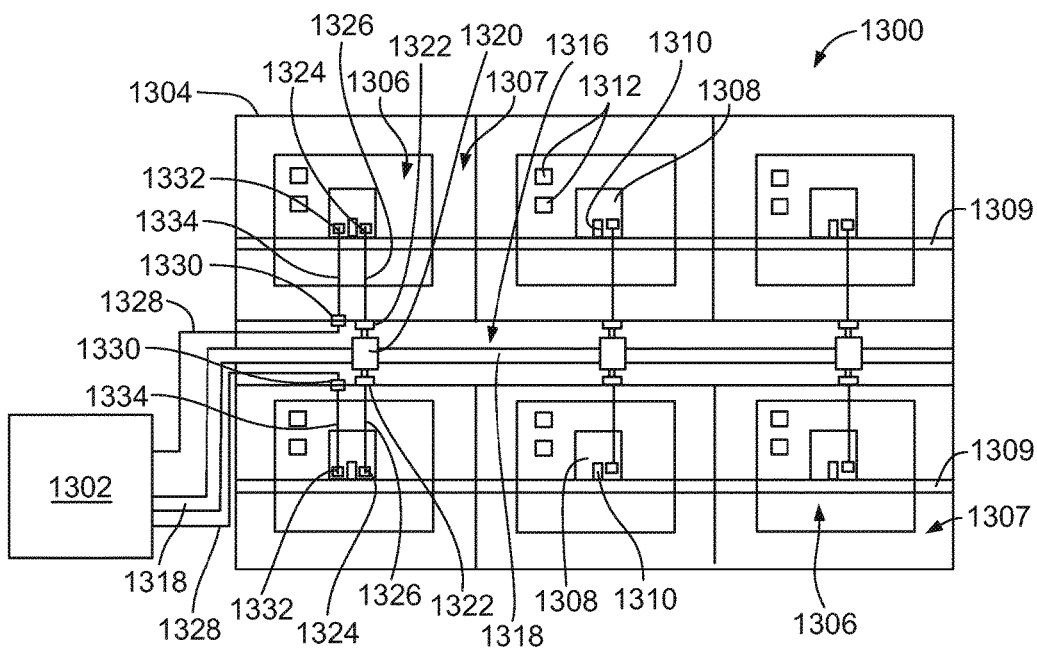
FIG. 13 is a back schematic view of a fan array formed in accordance with another embodiment.

FIG. 13 illustrates a fan array 1300 formed in accordance with an alternative embodiment. The fan array 1300 is joined to a master controller 1302. The master controller 1302 may be joined to the fan array 1300 or positioned remotely from the fan array 1300. The fan array 1300 includes a frame 1304 that houses fan units 1306 within chambers 1307 formed by the frame 1304. The fan units 1306 are joined to a mounting plate 1309 positioned within the frame 1304. The fan units 1306 are controlled and powered by the master controller 1302. In one embodiment, the fan units 1306 are independently powered by a source other than the master controller 1302. The fan array 1300 is configured to direct communications between the master controller 1302 and the individual fan unit 1306. The fan array 1300 operates using a fan array control system, for example, the fan array control system 1100 illustrated in FIG. 11 and/or the algorithms shown in FIGS. 19-22.

The master controller 1302 may be a general purpose computer to control the fan array 1300. Alternatively, the master controller 1302 may be a programmable logic controller programmed with an algorithm for operating the fan array 1300. The master controller 1302 may use variable-frequency drives, controlled by a digital signal to control the fan units 1306. For example, the master controller 1302 may control fan unit speed, and digitally-controlled relays to switch fan units 1306 on and off. The master controller 1302 may include a stand alone computer, laptop computer, a programmable microcontroller or processor which performs the various operations discussed herein. The master controller 1302 may include a microprocessor, or equivalent control circuitry and may further include RAM or ROM memory, logic and timing circuitry, state machine circuitry, and I/O circuitry. The details of the design and operation of the master controller 1302 are not critical to the present invention. Rather, any suitable master controller 1302 may be used that carries out the functions described herein.

Each fan unit 1306 includes a local motor controller 1308. The local motor controller 1308 may be a variable frequency drive or the like. The local motor controller 1308 controls the corresponding fan unit 1306 to which the local motor controller 1308 is joined. The local motor controllers 1308 are positioned within the individual chambers 1307. The local motor controllers 1308 communicate with the master controller 1302. The local motor controllers 1308 direct signals to the master controller 1302 indicative of an operation of the corresponding fan unit 1306. The master controller 1302 controls the operation of each fan unit 1306 based on the signals from the local motor controller 1308. The master controller 1302 directs instructions to the local motor controllers 1308 to control the operation of the corresponding fan units 1306. The local motor controllers 1308 and the master controller 1302 may direct signals and instructions indicative of a differential pressure within the fan unit 1306, a flow rate within the fan unit 1306, a speed of the fan unit 1306, or the like.

For example, the local motor controllers 1308 may direct signals to the master controller 1302 that are indicative of a differential pressure within each corresponding fan unit 1306. The master controller 1302 compares the differential pressure of each fan unit 1306 to a pre-determined differential pressure for the fan array 1300. The master controller 1302 determines adjustments to be made to the individual fan units 1306 based on the comparison of the individual differential pressures and the pre-determined differential pressure for the fan array 1300. The master controller 1302 then transmits a signal containing instructions to each local motor controller 1308. The local motor controller 1308 adjusts a parameter of the corresponding fan unit 1306 based on the instructions. For example, the master controller 1302 may instruct a portion of the local motor controllers 1308 to adjust a speed of the corresponding fan units 1306. The communications between the master controller 1302 and the local motor controllers 1308 may be continual throughout the operation of the fan array 1300. Alternatively, the operation of the fan units 1306 may be monitored at pre-determined intervals.

In the illustrated embodiment, the local motor controllers 1308 include a circuit breaker 1310. The circuit breaker 1310 enables power to the corresponding fan unit 1306 to be shut off. Each individual fan unit 1306 is capable of being shut off so that individual fan units 1306 may be maintained or replaced without shutting off power to the entire fan array 1300. The fan units 1306 may also include transducers 1312. In one embodiment, the transducers 1312 may be joined to the local motor controller 1308. The transducers 1312 monitor the operation of the fan unit 1306. For example, the transducers 1312 may be joined to pressure taps (not shown) in an inlet cone (not shown) of the fan unit 1306 to monitor a flow rate and/or a differential pressure through the fan unit 1306. In one embodiment, the transducers 1312 may monitor a speed of a fan (not shown) in the fan unit 1306.

The local motor controllers 1308 may continually monitor measurements from the transducers 1312. Alternatively, the local motor controllers 1308 may monitor measurements from the transducers 1312 at intervals. The local motor controllers 1308 monitor measurements from the transducers 1312 to determine a current operational capacity of the fan unit 1306. The local motor controllers 1308 deliver signals to the master controller 1302 indicative of the operational capacity of each corresponding fan unit 1306. For example, the operational capacity of each fan unit 1306 may include information related to fan speed, fan unit pressure, fan unit differential pressure, power consumption of the fan unit motor, or the like. The master controller 1302 processes the signals from the local motor controllers 1308 and transmits instructions to the local motor controllers 1308 indicative of operational adjustments required for each corresponding fan unit 1306.

A signal path formed as a wire raceway 1316 extends across the frame 1304. The wire raceway 1316 is illustrated in a cut-away view to show the inside of the wire raceway 1316. The wire raceway 1316 extends between rows of fan units 1306. Alternatively, the wire raceway 1316 may extend across any portion of the frame 1304. The wire raceway 1316 carries a high voltage wire 1318 and low voltage wires 1328. The high voltage wire 1318 and the low voltage wires 1328 are joined to the master controller 1302. The high voltage wire 1318 is configured to carry power signals. In one embodiment, the high voltage wire 1318 is joined to a power source other than the master controller 1302. The low voltage wires 1328 are configured to carry data signals. In one embodiment, the fan array 1300 does not include a low voltage wire 1328 and the data signals are transmitted over the high voltage wire 1318.

The high voltage wire 1318 includes connectors 1320 positioned within the wire raceway 1316. The connectors 1320 are joined to plugs 1322 positioned on the wire raceway 1316. The plugs 1322 are aligned with plugs 1324 provided on the local motor controllers 1308. In one embodiment, the plugs 1322 and/or 1324 may be sockets or the like. Cables 1326 extend between the plugs 1322 and 1324 to electrically couple the local motor controllers 1308 to the high voltage wire 1318. The high voltage wire 1318 powers each of the local motor controllers 1308. The plugs 1322 and 1324 enable the fan units 1306 to be quick-connected or disconnected to the high voltage wire 1318.

The low voltage wires 1328 extend from the master controller 1302 through the wire raceway 1316. The low voltage wires 1328 are joined to a plug 1330 positioned on wire raceway 1316. The plug 1330 is aligned with a plug 1332 positioned on the corresponding local motor controller 1308. In one embodiment, the plugs 1330 and/or 1332 may be sockets or the like. A cable 1334 extends between the plugs 1330 and 1332 to electrically couple the local motor controller 1308 to the corresponding low voltage wire 1328. The plugs 1330 and 1332 enable the fan unit 1306 to be quick-connected or disconnected to the low voltage wire 1328. The low voltage wires 1328 transmit data signals between the local motor controller 1308 and the master controller 1302. The illustrated embodiment includes two low voltage wires 1328 extending to individual local motor controllers 1308. In alternative embodiments, one low voltage wire 1328 is joined to each local motor controller 1308. In another embodiment, each local motor controller 1308 is joined to a separate low voltage wire 1328 as shown in FIG. 14.

Figure 14A:
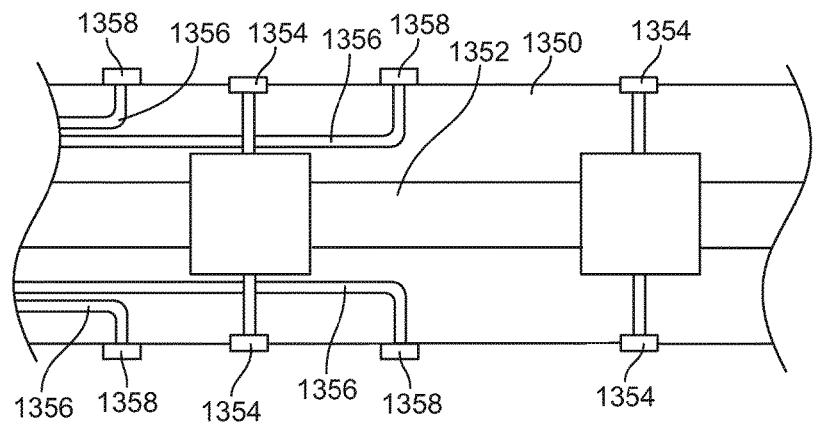
FIG. 14a is an expanded cutaway view of a wire raceway formed in accordance with an embodiment.

FIG. 14a is an expanded cutaway view of a wire raceway 1350 formed in accordance with an embodiment. The wire raceway 1350 is configured to join to four fan units (not shown). The wire raceway 1350 includes a high voltage wire 1352 joined to four plugs 1354. Each fan unit is configured to electrically couple to one of the plugs 1354. The wire raceway 1350 also includes four low voltage wires 1356 each joined to a plug 1358. Each of the four fan units is configured to electrically couple to one of the plugs 1358. In one embodiment, the plugs 1354 and/or 1358 may be sockets or the like.

Figure 14B:
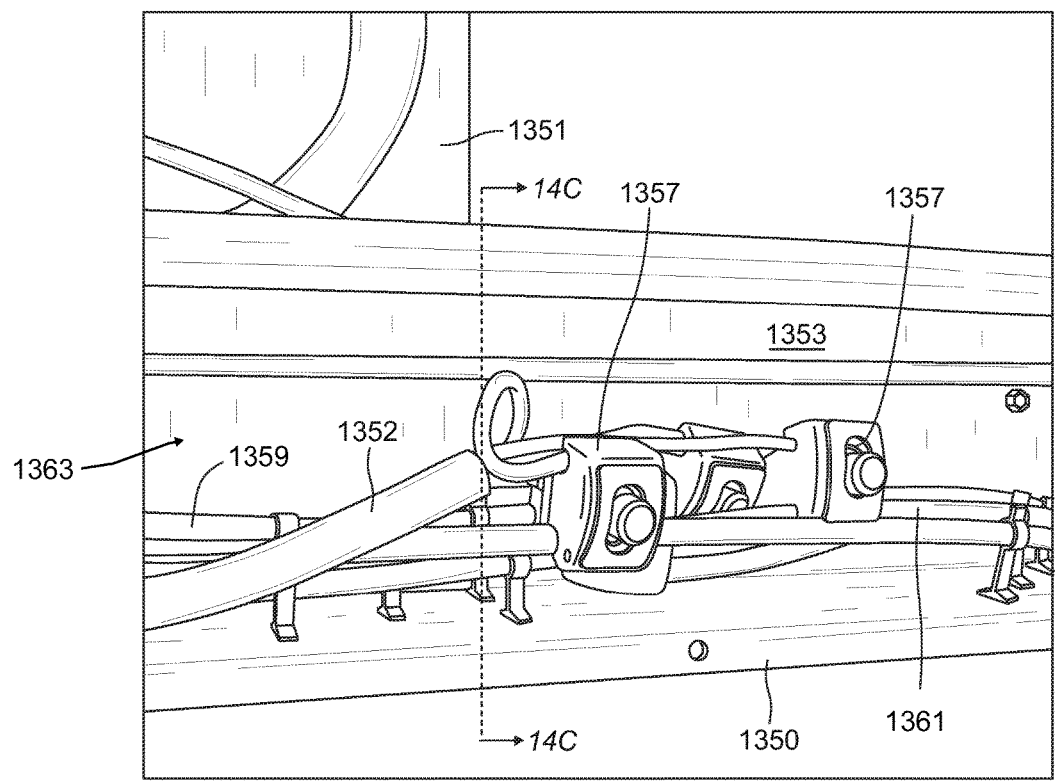
Figure 14C:
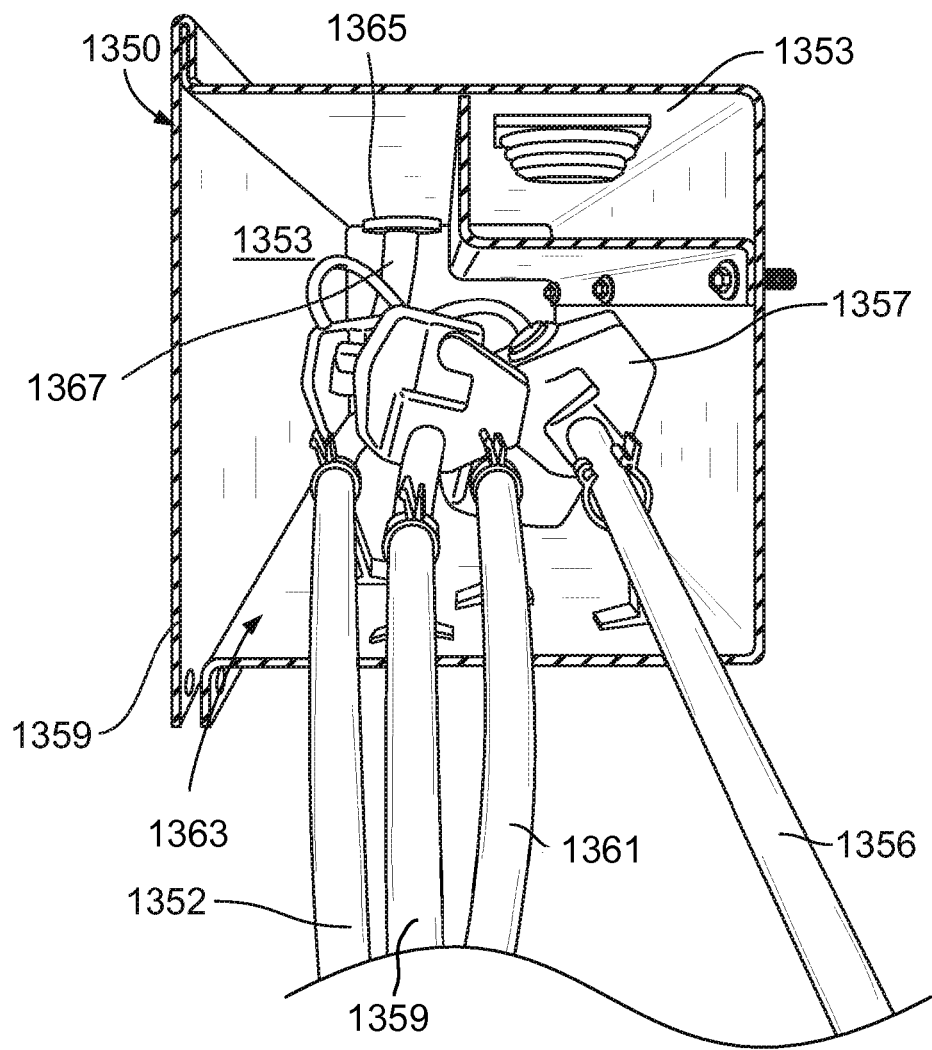
FIG. 14c is a cross-sectional view of the wire raceway shown in FIG. 14b.

FIG. 14b illustrates an alternative embodiment of the wire raceway 1350 extending along a fan unit 1351. The wire raceway 1350 includes three-phase power high voltage wires 1352, 1359, and 1361 extending along a cavity 1363 formed in the wire raceway 1350. The high voltage wires 1352, 1359, and 1361 are joined to connectors 1357. The connectors 1357 are configured to be electrically coupled to the fan unit 1351, as illustrated in FIG. 14c. The high voltage wires 1352, 1359, and 1361 are configured to couple to multiple connectors 1357 so that multiple fan units 1351 may be electrically coupled to the high voltage wires 1352, 1359, and 1361. In the illustrated embodiment, the wire raceway 1350 also includes a cavity 1353. The cavity 1353 is separated from the cavity 1363. The cavity 1353 is configured to carry the low voltage wires 1356 illustrated in FIG. 14a.

FIG. 14c illustrates a cross-sectional view of an embodiment of the wire raceway 1350 taken about line 14c-14c shown in FIG. 14b. The wire raceway 1350 includes the second cavity 1353 positioned within the cavity 1367. The second cavity 1355 may carry additional low voltage wires and/or high voltage wires. In the illustrated embodiment, the cavity 1367 carries both the high voltage wires 1352, 1359, and 1361 and the low voltage wires 1356. In one embodiment, one of the high voltage wires 1352, 1359, and 1361 or the low voltage wires 1356 may be carried through the second cavity 1353. The cavity 1367 is enclosed with a cover 1359. The cover 1359 encloses the high voltage wires 1352, 1359, and 1361 and the low voltage wires 1356 within the wire raceway 1350. The cover 1359 prevents exposure of the high voltage wire 1352, 1359, and 1361 and the low voltage wires 1356. The cover 1359 is removable to provide access to the cavity 1367.

The high voltage wires 1352, 1359, and 1361 and the low voltage wires 1356 are joined to the connectors 1357. A wire 1363 extends from the connector 1357. The wire 1363 may include signal paths from both the high voltage wires 1352, 1359, and 1361 and the low voltage wires 1356. The wire raceway 1350 includes an opening 1365 extending therethrough. In the illustrated embodiment, the wire 1363 extends through the opening 1365 to the fan unit 1351. The opening 1365 may be replaced with a plug similar to the plugs 1354 and 1358 as illustrated in FIG. 14a. Alternatively, the wire raceway 1350 may include the plugs 1354 and 1358 coupled to the high voltage wires 1352, 1359, and 1361 and low voltage wires 1356, respectively. The wire raceway 1350 may include a plurality of openings 1365 to receive any one of the high voltage wires 1352, 1359, and 1361 and the low voltage wires 1356.

Figure 15A:
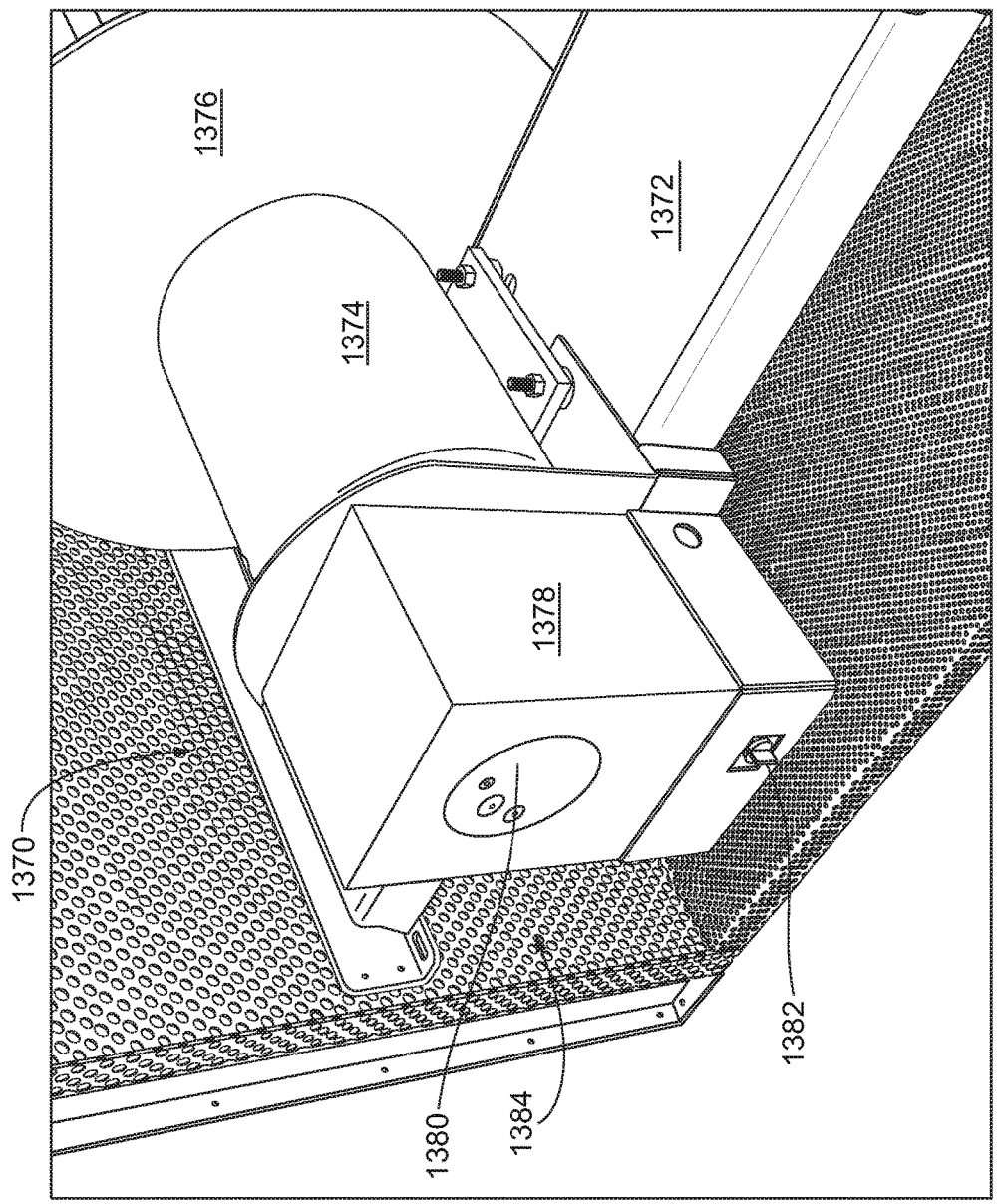
FIG. 15a is a back perspective view of a fan unit formed in accordance with an embodiment.

FIG. 15a illustrates a fan unit 1370 formed in accordance with an embodiment. The fan unit 1370 is mounted to a mounting plate 1372. The fan unit 1370 includes a motor 1374 and a fan 1376. A local motor controller 1378 is joined to the motor 1374. The local motor controller 1378 includes a keypad 1380 to program the local motor controller 1378. A circuit breaker 1382 is joined to the local motor controller 1378 to control power to the local motor controller 1378. The fan unit 1370 is positioned within a chamber 1384 of a fan array.

FIG. 15b illustrates an alternative embodiment of the fan unit 1370. A wire raceway 1371 extends adjacent to the fan unit 1370. The wire raceway 1371 carries a high voltage wire 1373, 1383, and 1385 and low voltage wire 1375. The high voltage wires 1373, 1383, and 1385 are joined to a connector 1377. A wire 1379 extends from the connector 1377. The wire 1379 carries high voltage signals from the high voltage wires 1373, 1383, and 1385. The wire 1379 extends through an opening 1381 in the wire raceway 1371. Alternatively, the wire 1379 may be joined to a plug (not shown) positioned on the wire raceway 1371. The wire 1379 electrically couples to the fan unit 1370.

The wire 1379 is coupled directly to the circuit breaker 1382 of the fan unit 1370. The circuit breaker 1382 is electrically coupled to the local motor controller 1378. The low voltage wire 1375 is also joined to the local motor controller 1378. Both the circuit breaker 1382 and the local motor controller 1378 are joined to the fan unit 1370. Transducers 1383 are also joined to the fan unit 1370. The transducers 1383 monitor properties of the fan unit 1370. The local motor controller 1378 relays signals indicative of the fan unit properties to a master controller (not shown) via the low voltage wire 1375. The master controller sends instructions back to the local motor controller 1378 based on the signals. The local motor controller 1378 controls the operation of the fan unit 1370.

Figure 16:
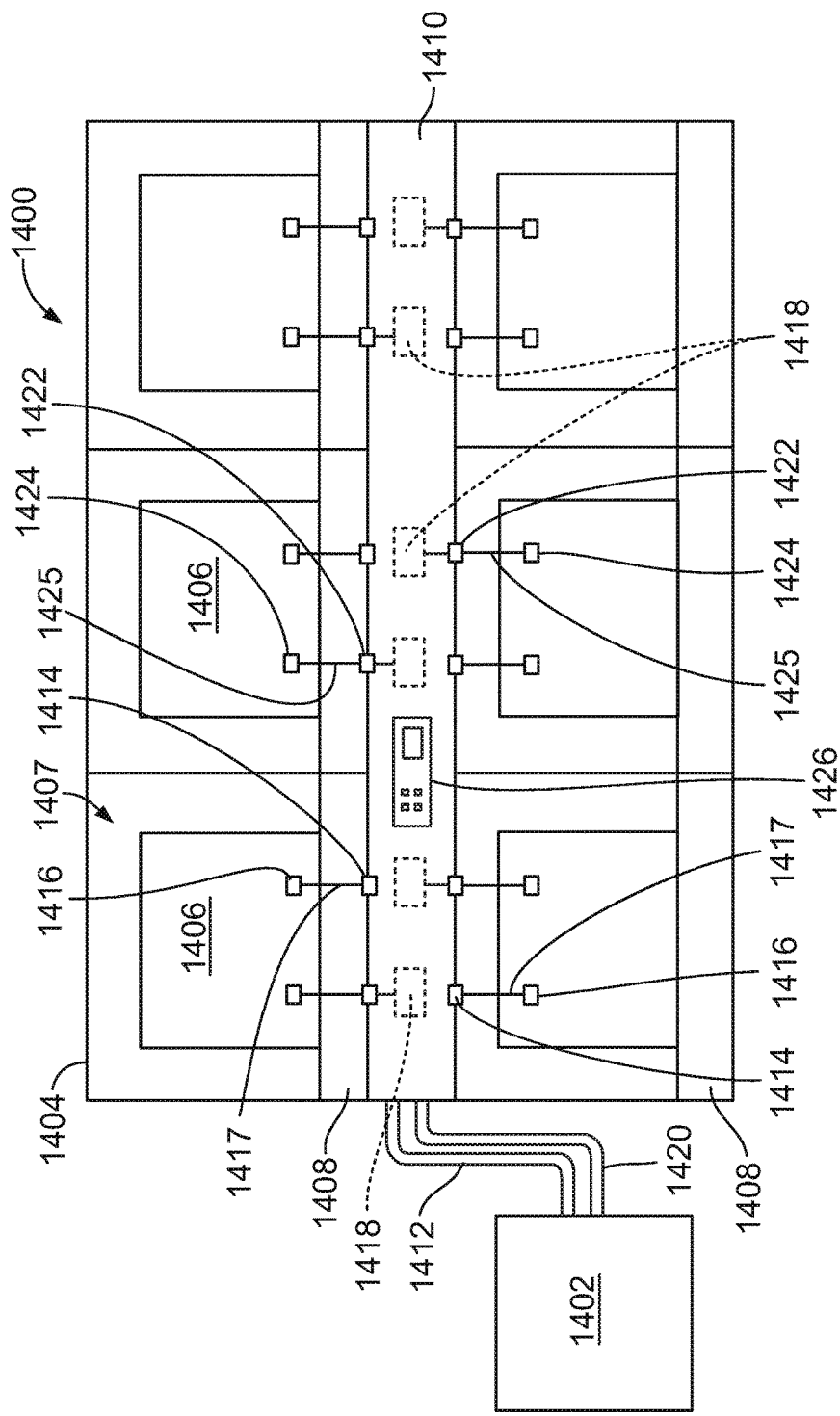
FIG. 16 is a back schematic view of a fan array formed in accordance with another embodiment.

FIG. 16 illustrates a fan array 1400 formed in accordance with an alternative embodiment. The fan array 1400 is joined to a master controller 1402. The fan array 1400 includes a frame 1404 that houses fan units 1406 within chambers 1407 of the frame 1404. The fan units 1406 are mounted to mounting plates 1408 positioned within the chambers 1407. A signal path formed as a wire raceway 1410 extends across the frame 1404. The wire raceway 1410 carries a high voltage wire 1412 and at least one low voltage wire 1420. The high voltage wire 1412 and the low voltage wire 1420 are joined to the master controller 1402. The high voltage wire 1412 is joined to a plurality of plugs 1414 positioned on the wire raceway 1410. Each plug 1414 is aligned with a plug 1416 positioned on each fan unit 1406.

The plugs 1414 and 1416 are joined by a cable 1417 to electrically couple the fan units 1406 to the high voltage wire 1412.

Local motor controllers 1418 are positioned within the wire raceway 1410. Each local motor controller 1418 is electrically coupled to the low voltage wire 1420. Each local motor controller 1418 is joined to a plug 1422 positioned on the wire raceway 1410. The plugs 1422 are aligned with plugs 1424 on each fan unit 1406. A cable 1425 extends between the plugs 1422 and 1424 to electrically couple each fan unit 1406 to a local motor controller 1418. A keypad 1426 is positioned on the wire raceway 1410 to program the local motor controllers 1418. In one embodiment, each local motor controller 1418 may be joined to a separate keypad 1426. Alternatively, the keypad 1426 may be provided on the master controller 1402.

Figure 17:
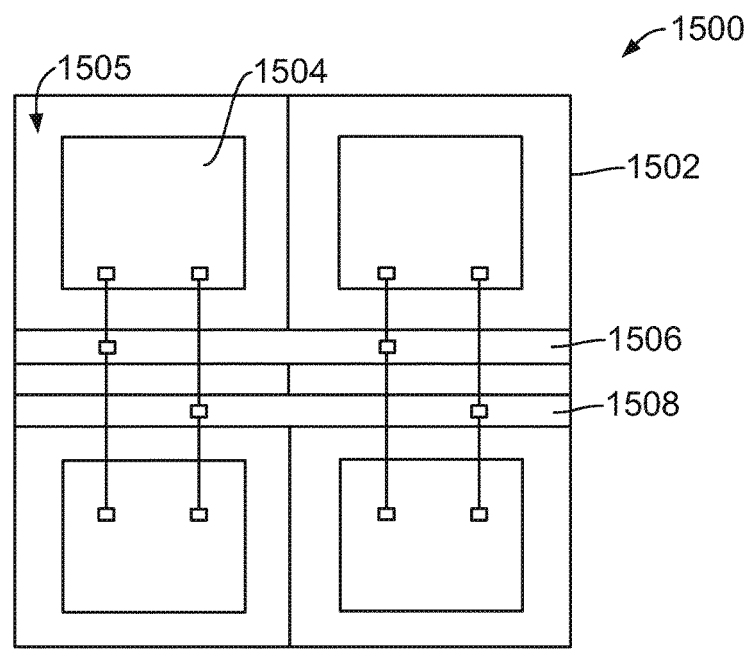
FIG. 17 is a back schematic view of a fan array formed in accordance with another embodiment.

FIG. 17 is fan array 1500 formed in accordance with an alternative embodiment. The fan array 1500 includes a frame 1502 that houses fan units 1504 individual chambers 1505. A high voltage raceway 1506 and a low voltage raceway 1508 extend across the frame 1502. The high voltage raceway 1506 is configured to carry a high voltage wire (not shown) that provides power to the fan units 1504. The low voltage raceway 1508 is configured to carry at least one low voltage wire (not shown) that couples the fan units 1504 to a master controller (not shown).

Figure 18:
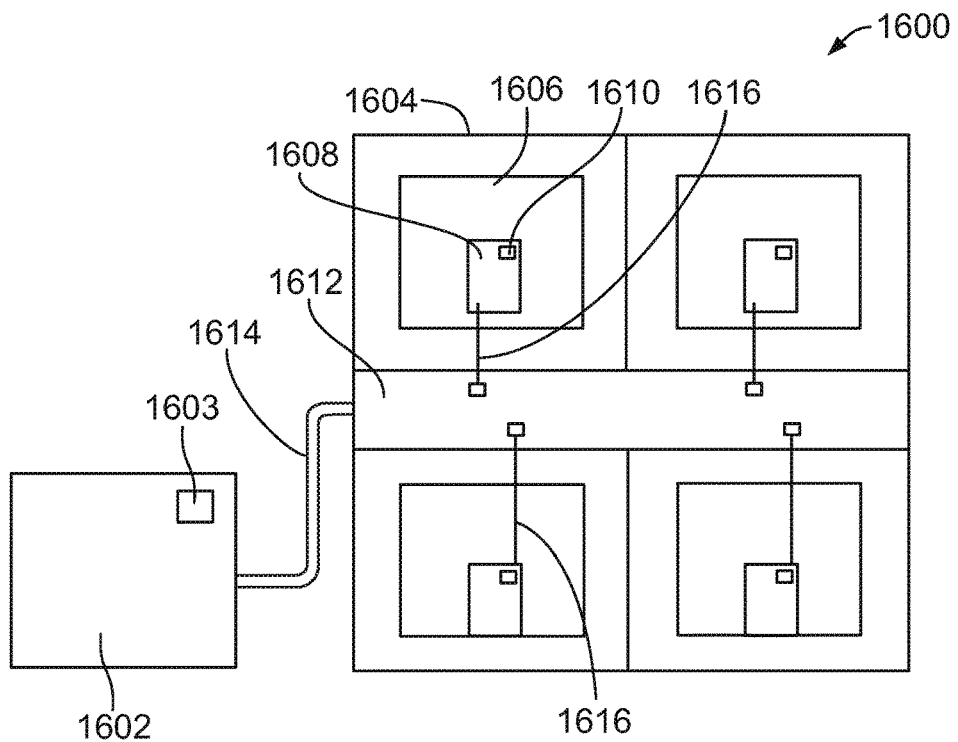
FIG. 18 is a back schematic view of a fan array formed in accordance with another embodiment.

FIG. 18 illustrates another fan array 1600 formed in accordance with another embodiment. The fan array 1600 is joined to a master controller 1602 having a wireless transmitter 1603. The fan array 1600 includes a frame 1604 that houses fan units 1606. The fan units 1606 include local motor controllers 1608 having wireless transmitters 1610. The local motor controllers 1608 wirelessly communicate with the master controller 1602 via the wireless transmitters 1603 and 1610. A wire raceway 1612 extends across the frame 1604. The wire raceway 1612 carries a high voltage wire 1614 from the master controller 1602. The high voltage wire 1614 is joined to each fan unit 1606 with cables 1616 to provide power to the fan units 1606.

Figure 19:
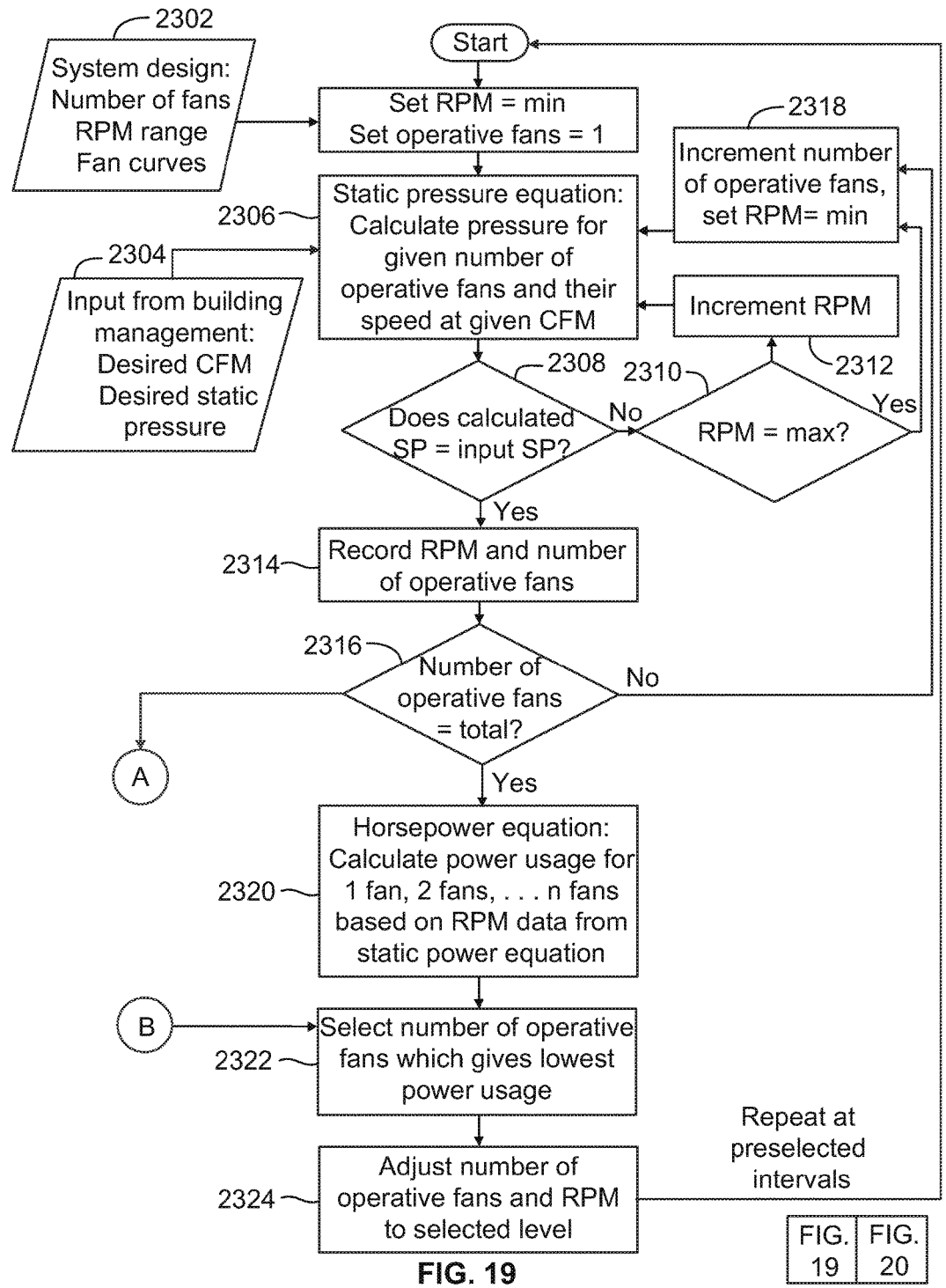
FIG. 19 illustrates an algorithm for operating a fan array in accordance with an embodiment.

FIG. 19 illustrates an algorithm for controlling a master controller. A master controller may be implemented to automatically select a number of operative fan units and the RPM speed of each fan unit in order to achieve a predetermined or desired level of efficiency for the overall fan array. For example, the desired level of efficiency may be to approximately maximize the efficiencies, to attain a high percentage efficiency (e.g., 90%, 80%, etc.) and the like. In certain applications, fan units may achieve the desired level of efficiency within a narrow RPM range. In an exemplary embodiment, the master controller operates in a feedback control loop to maintain the fan units continuously operating in a desired efficiency range. The master controller varies the airflow and/or static pressure continuously or periodically by varying the number of fan units operative within the array as environmental parameters for the building change. By way of example, environmental parameters for a building include airflow, humidity, temperature and the like. For example, a target environmental parameter for airflow may be set to one-half of a maximum fan-array airflow capacity during the day and 40% at night. Thus the master controller may only turn on half of the fan units within the fan-array during the day and turn on 40% of the fan units at night. In this way, energy consumption may be greatly reduced.

The master controller achieves a desired level of efficiency of the fan array through the use of an iterative process as shown in FIG. 19. Building management provides environmental parameters or programmed constraints, at 2304, based on the air handling needs at a given time or over repeated time intervals. These environmental parameters or constraints 2304 may include factors such as static pressure, total airflow, humidity, temperature and the like for desired time periods (e.g., day, night, week days, weekend, etc.). Initially, the master controller sets an initial number of operative fans to a predetermined number (e.g. one) and sets an initial RPM speed to a predetermined level (e.g., a fan minimum or a percentage of the motor maximum rated RPM speed, etc.). At 2306, the master controller calculates a static pressure based on the current number of operative fans and the current RPM speed for a predetermined CFM. Next, at 2308, the master controller determines whether the candidate static pressure satisfies (e.g. corresponds to) the programmed constraints (e.g., programmed static pressure environmental parameter) that was input by the building management operator. If not, flow moves to 2310, where it is determined whether the current RPM speed has reached a maximum for the motor or fan. If not, flow moves to 2312 where the RPM speed is incremented by a predetermined amount and a new candidate static pressure is recalculated at 2306.

If at 2310, the RPM speed has reached the maximum rated level of the motor or fan, then flow moves to 2318 where the number of operative fans is incremented by a predetermined amount. At 2318, the RPM speed is reset to the initial RPM speed. Next, a new candidate static pressure is calculated at 306. The master controller repeats the calculations at 2306-2318 until the candidate static pressure corresponds to the static pressure input by the building management operator, which represents the RPM speed at which a number of the fan units should be run in order to satisfy the programmed environmental parameters or constraints. For example, the number of fans may represent a single fan unit, two fan units, and all numbers of fan units up to the total number of fan units in the system. At 2314, the master controller records, in memory, the RPM speed and number of operative fan units as a potential or candidate RPM/fan unit combination that would achieve the programmed/input static pressure.

Next at 2316, the master controller determines whether the candidate number of operative fan units equals the total number of fan units in the fan array. If not, flow returns to 2318 where the number of operative fan units is again incremented and the RPM speed is reset to the initial RPM speed. If the candidate number of operative fan units equals the total number of fan units in the fan array, flow moves to 2320. As the process iterates through the operation at 2314, a table of potential RPM/fan unit combinations is created where each entry in the table includes a combination of a candidate RPM speed and a number of operative fan units for the associated input static pressure. Optionally, the candidate RPM speed and number of operative fan units may be saved as the sole candidate for the corresponding static pressure. Once the calculation 2306-2318 is completed, the master controller has created and saved multiple combinations of candidate RPM speeds and candidate number of operative fan units that each achieves the programmed or input static pressure.

At 2320, the master controller successively analyzes each of the potential RPM/fan unit combinations saved in the table created at 2314. For each entry in the table, the master controller calculates the horsepower required to run the corresponding number of operative fan units (e.g., for each combination of candidate RPM speeds and candidate number of operative fan units that achieve the programmed static pressure).

For example, if one of the potential RPM/fan unit combinations in the table indicated that 5 fan units were to be operative at 2000 rpms, the master controller would calculate the power usage of each of the five fan units for the corresponding 2000 rpm speed. Similarly, if another potential RPM/fan unit combination in the table indicated that 10 fan units should be operative at 1500 rpms, the master controller would calculate the power usage of each of the 10 fan units at 1500 rpms. Once the power usage is calculated for each potential RPM/fan unit combination, the master controller then identifies at 2322 a resultant RPM/fan unit combination that utilizes the desired power usage (e.g., lowest power). From the table of potential RPM/fan unit combinations, the system may select, at 2322, the resultant RPM/fan unit combination that requires the least horsepower. Then at 2324, the master controller turns fan units on or off until the number of operative fan units corresponds to the resultant RPM/fan unit combination. At 2324, the master controller adjusts the speed of the fan units that are operative to correspond to the RPM speed indicated in the resultant RPM/fan unit combination. In this way, the system will continuously select an efficient combination of the number of operative fan units and fan unit RPM speed to satisfy the programmed constraints 2304 provided by the building management operator.

The fan array is run by the local motor controllers. The speed at which the fan units run may be the same for all fans which corresponds to the result and RPM speed. Optionally, the RPM speed of a set or group of fan units may be independently controlled. Alternatively, the fan units in a row or column may be set to a common RPM speeds (e.g., $1^{st}$ and last rows set to operate at 2000 rpms, while middle rows are set to operate at 3000 rpms). Optionally, the RPM speed of each fan unit may be independently controlled.

As a further option, multiple local motor controllers may be made generally available without a direct relation to any particular motor. The local motor controllers may be configured to be dynamically coupled to one or more corresponding fan units at run time. In this example, the number of local motor controllers may be used that correspond to the number of different RPM speeds that are to be utilized simultaneously. For example, one of the local motor controllers may be coupled to a first set of fan units that are set at an RPM speed of 2000 rpm, while a second of the local motor controllers may be coupled to a second set of fan units that are set at an RPM speed of 3000 rpm.

The calculations at 2306 may be made based upon fan curves 2302 provided by the manufacturer at the time of installation. Fan curves 2302 are calculated by taking an individual fan unit and measuring its static pressure output and horsepower input as a function of total airflow. This measurement may occur inside of the air-handling system installed in the building, because the results will vary based on, for instance, the size, shape, and configuration of the plenum in which the fan units are placed. The resulting data may then be fitted with a polynomial curve—the fan curve 2302—preferably of fifth or sixth order, with the independent variable being the airflow. The coefficients for each power of the independent variable corresponding to the best-fit curve are found and recorded. Commercially available data analysis software is suitable for this task. When the fitting process is complete, an equation is obtained that will accurately give the static pressure of a single fan unit at a particular airflow. The total static pressure of the system is then given by a summation equation as follows:

$$\sum_{n=0}^{X} C_n CFM^n \left(\frac{Df}{Ef}\right)^n \left(\frac{Ds}{Es}\right)^{n-2},$$

where $C_n$ is the nth power coefficient from the static pressure polynomial curve fit described above, CFM is the airflow in cubic feet per minute, Df is the total number of fan units in the system, Ef is number of operative fan units, Ds is the design maximum speed of the fan units, Es is the actual operating speed of the fans, and X is a the order of the polynomial used for the static pressure curve fit. Given a static pressure and a required airflow, the master controller may iteratively determine at 2306-2318 the RPM speed of the fan units for each number of operative fan units by inserting different values of RPMs, at 2312, into the static pressure equation calculated at 2306 until the desired static pressure is reached at 2308. This process is repeated 2318 for a single fan unit, two fan units, and so on until the total number of fan units in the array has been reached. Each of the RPM values is then recorded 2314 for use by the horsepower calculation 2320. The use of a computer greatly speeds the process of finding the necessary fan unit speed for each of the various numbers of operative fan units.

As described above, a polynomial curve, again preferably of fifth or sixth order, is also fitted to the data showing brake horsepower as a function of airflow for an individual fan unit, and the total consumption of the array is then be calculated by summing the consumption of individual fan units. The result of the speed calculation given above is used to simplify the horsepower calculation. After calculating the necessary fan unit speed for each number of operative fans, the resultant operative number/RPM pairs is passed to the brake horsepower equation given by $$\sum_{n=0}^{X} C_n CFM^n \left(\frac{Df}{Ef}\right)^{n-1} \left(\frac{Ds}{Es}\right)^{n-3},$$

where $C_n$ is the nth power coefficient of the horsepower polynomial curve fit described above, CFM is the airflow in cubic feet per minute, Df is the total number of fan units in the system, Ef is number of operative fan units, Ds is the design maximum speed of the fan units, Es is the operating speed of the fans taken from the static pressure equation, and X is a the order of the polynomial used for the horsepower curve fit. The master controller may then calculate 2320 the power consumption of the one fan case, the two fan case, and so on up to the total number of fan units based upon the RPM information 2314 from the static pressure equation 2306. It is then a simple matter for the master controller to identify 2322 a preferred number of fan units and the fan unit speed that will achieve a desired level of power consumption. The master controller may then optionally directly adjust 2324 the number of operative fan units to achieve the desired level of power consumption, or it may optionally output a suggestion for a human operator to implement manually. In an exemplary embodiment, the master controller recalculates the optimal number of operative fan units at an interval of less than one minute. The frequency of recalculation is limited only by the speed of the computer performing the calculation. In this way, changes in the building's needs may be rapidly implemented and high efficiency achieved at all times.

The master controller may be implemented in any of a number of ways. For instance, a general purpose computer may be programmed to control the fan array. Alternatively, a programmable logic controller may be programmed with the necessary algorithm. Either of these may use variable-frequency drives, controlled by a digital signal, to control fan unit speed, and digitally-controlled relays to switch fan units on and off. The master controller may include a stand alone computer, laptop computer, a programmable microcontroller or processor which performs the various operations discussed herein. The master controller may include a microprocessor, or equivalent control circuitry and may further include RAM or ROM memory, logic and timing circuitry, state machine circuitry, and I/O circuitry. The details of the design and operation of the master controller are not critical to the present invention. Rather, any suitable master controller may be used that carries out the functions described herein.

Figure 20:
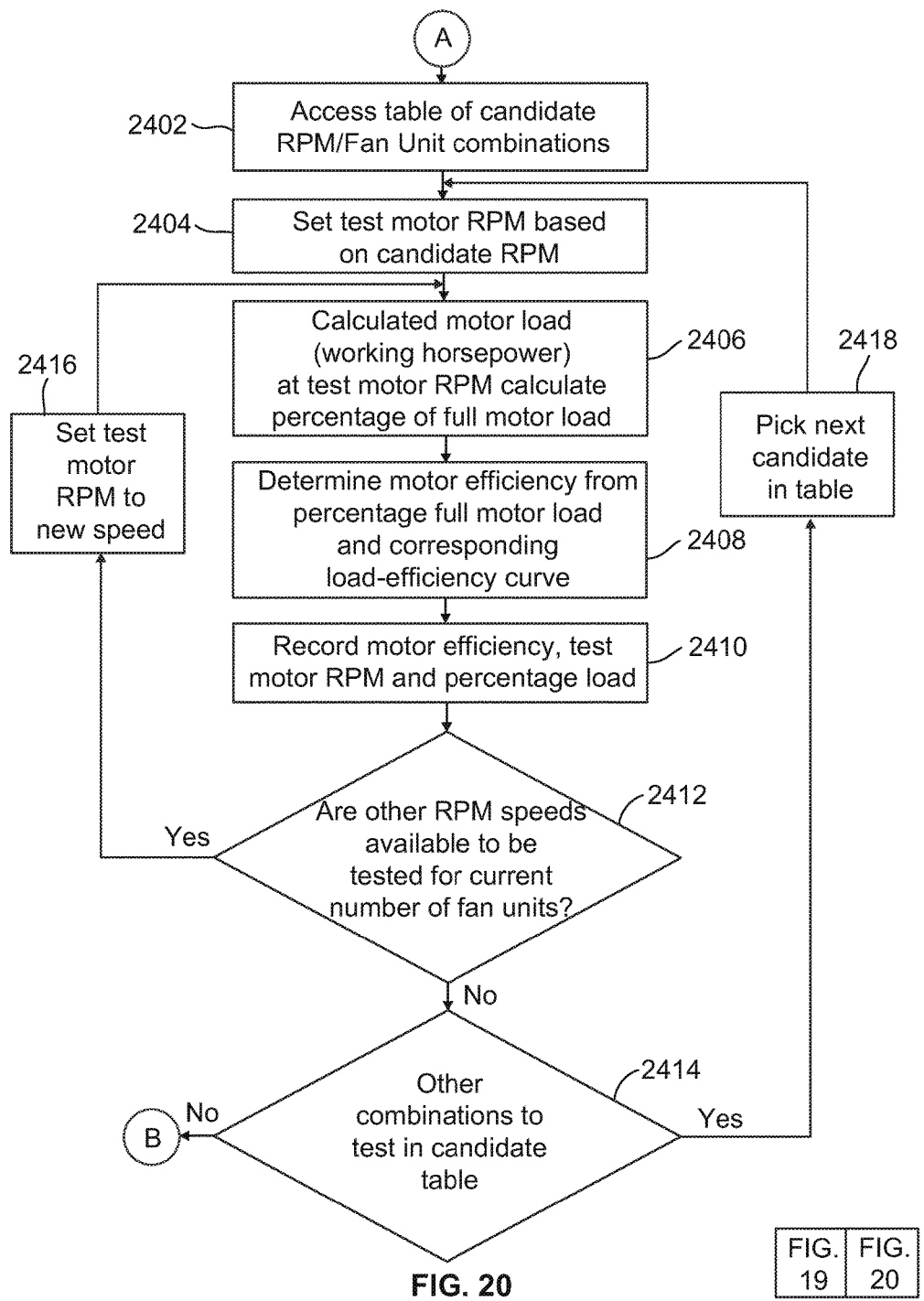
FIG. 20 illustrates an algorithm for operating a fan array in accordance with an embodiment.

FIG. 20 illustrates a process for calculating motor load-efficiency that may be carried out in connection with an alternative embodiment. For example, the process of FIG. 20 may be inserted into the process of FIG. 19 in place of the horsepower calculation operation at 2320. The electric motors coupled to the fan units are generally configured to operate at 40% to 100% of the rated load (e.g., the rated horsepower). For example, a motor with a rated load of 10 horsepower (hp) may be configured to operate between 4 and 10 hp. Each motor exhibits a varying amount of efficiency depending, in part, on where the motor operates relative to the motor rated load. For example, a motor may exhibit peak efficiency when operated at or near 70% or 85% of the motor rated load. As a further example, a motor having a 10 hp rated load may have an acceptable load range of 4 to 10 hp, with a peak efficiency at 7.5 to 8.5 hp. Motor efficiency may decrease as the motor's operating load moves below 40% of the rated load or moves near 100% of the rated load. The efficiency curve for motors varies between individual motors and based on motor size and rated load.

The process of FIG. 20 analyzes values for various motor control parameters to determine which values will result in the motor operating with a desired level of motor efficiency. At 2402, the table of candidate RPM/fan unit combinations (that was created at 2314 in FIG. 19) is accessed and the first candidate combination is analyzed. At 2404, a test motor RPM speed is set to correspond to the candidate RPM speed in the first candidate combination from the table. At 2406, the master controller calculates the current motor load (e.g., in working horsepower) that would be experienced for an individual fan unit when operated at the test motor RPM speed. The current motor load is then compared to the motor's full load (e.g., maximum horsepower) to obtain a percentage full motor load that would be drawn by the motor when operating at the test motor candidate RPM speed. For example, if the test motor candidate RPM speed were 3000 rpm, the master controller may determine that this motor will operate at 7 horsepower. If the motor has a full or maximum load of 10 hp, then 7 hp would be a 70% of the full motor load.

Next, at 2408 the master controller determines the motor efficiency from the percentage full motor load calculated at 2406. The motor efficiency may be determined through algorithmic analysis, or from efficiency tables, or from a motor load-efficiency curve, or a combination thereof and the like. For example, if a motor is operating at 70% of full motor load, a load-efficiency curve may indicate that this motor has an efficiency of 90% when at 70% full motor load. Once the motor efficiency has been determined, then at 2410 the master controller records the motor efficiency, the corresponding RPM speed, the percentage load and the number of operative fan units in a table as a motor-refined candidate RPM/fan unit combination. The foregoing information may be recorded in the same table or a different table as utilized at 2314 to record the candidate RPM/fan unit combinations.

Next at 2412, the master controller determines whether the test motor RPM speed is the last or only available RPM speed for the current number of fan units. If not, flow moves to 2416 where the RPM speed is set to a new RPM speed. For example, the RPM speed may be increased or decreased by a set amount at 2416. Next, the operations at 2406 to 2410 are repeated and a new motor-refined candidate RPM/fan unit combination is obtained and saved in the table. The operations at 2406 to 2410 are repeated until the current number of operative fan units has no more available RPM speeds that may be used. For example, the RPM speed may be successively stepped through a range of RPM speeds that start at a set number of RPMs or at a set percentage below the candidate RPM speed. The operation at step 2418 may up the RPS speed until reaching an RPM speed that is a set number of RPMs, or a set percentage, above the candidate RPM speed. Once the available RPM speeds are analyzed for the current number of operative fan units, flow moves from 2412 to 2414.

At 2414, the master controller determines whether additional candidate RPM/fan unit combinations exist in the table created at 2314 (FIG. 19). For example, if the table includes ten candidate RPM/fan unit combinations, and there are five available RPM speeds that are desired to be tested with each combination, then the operations at 2406 to 2412 are repeated five times (one for each of the 5 available RPM speeds) for each of the ten candidate RPM/fan unit combinations. In the foregoing example, the operations at 2406 to 2414 would create a table with 50 motor-refined candidate RPM/fan unit combinations. Thereafter, flow returns to 2322 in FIG. 19. Returning to FIG. 19, at 2322, the master controller selects the motor-refined candidate RPM/fan unit combination that exhibited a desired motor efficiency and static pressure.

FIG. 21 illustrates a multi-tier speed array processing sequence carried out in accordance with an alternative embodiment to calculate multiple sets of operative fan units where each set of operative fan units includes a different RPM speed. Beginning at 2502, the number of tiers is set. For example, two or three different RPM speeds may be programmed to be used at the same time. For example, interior fan units may be operated at a higher RPM speed, while peripheral fan units may be operated at a lower fan speed, or vice versa. Alternatively, operative fan units in each row or each column may be alternately assigned first and second RPM speeds. Thus, adjacent fan units may have different RPM speeds, while all of the operative fan units assigned the first RPM speed are interleaved with the operative fan units assigned the second RPM speed. For example, a fan array may be divided into four quadrants, with each quadrant assigned a different RPM speed. As a further example, operative fan units in a first quadrant of the fan array may be assigned a common RPM speed, while one or more quadrants of the fan array may be assigned a different RPM speed. Alternatively, opposed quadrants may be assigned a common RPM speed.

At 2503 the master controller calculates the portion of the total static pressure to be contributed by each of the tiers. The tier contributions may be equal or different. The tier contributions may be proportional to the number of fan units in each tier. For example, if a first tier includes 50% of the total fan units, a second tier includes 25%, a third tier includes 15% and a fourth tier includes 10%, then each tier would be assigned a corresponding percentage (50%, 25%, 15%, 10%) of the programmed static pressure.

Next, at 2504, the master controller calculates the number of operative fan units and the RPM speed for a current tier. For example, in a two tier 25 fan unit array, where the first and second tiers include 75% and 25%, respectively, of the total fan units, then 75% and 25% of the static pressure would be attributed to each tier. Hence, tier one may utilize 10 operative fan units out of 15 total fan units, while tier two may utilize 2 operative fan units out of 5 total fan units.

Next at 2506 the RPM speed and number of operative fan units for a current tier may be refined based on motor efficiencies as discussed above in connection with FIG. 20. Optionally, the operation at 2506 may be omitted entirely. Next at 2508 it is determined whether all of the tiers have been analyzed and assigned RPM speeds and numbers of operative fan units. If not, flow moves to 2510 where the current tier is incremented. The operations at 2504 and 2506 are repeated for the next tier. When at 2508 it is determined that no more tiers exist, the process is completed.

FIG. 22 illustrates a fan array reconfiguration process implemented in accordance with an alternative embodiment. At 2602, the master controller determines a current or initial configuration of operative fan units. For example, the initial configuration of operative fan units may resemble a checker pattern where alternate fan units are ON and alternate fan units are OFF. After 2602, alternative steps may be implemented. For example, in accordance with one embodiment, flow may move to 2604 where the controller 300 accesses a collection of stored templates or stored preprogrammed patterns of operative fan units. Optionally, at 2606, the master controller may implement an algorithm to automatically calculate a new pattern for the operative fan units. Next, at 2608, the master controller may update the current pattern of operative fan units with a new pattern of operative fan units from the templates or preprogrammed patterns at 2604, or calculated at 2606.

Different patterns may be preprogrammed or automatically calculated to evenly distribute the life cycle of the fan units. For example, if a first pattern resembles a checker pattern, the second pattern may include the gaps in the first pattern. Thus, if the first pattern of operative fan units includes fan units #1, #3, #5, and #7 in the first row, the second pattern of operative fan units may include the fan units #2, #4, #6 and #8. The master controller may periodically (e.g., every month, every quarter, etc.) switch from one pattern to a different pattern. For example, it may be desirable to switch patterns to evenly distribute the life cycle between the fan units. Hence, over a multi-year period, all or most of the fan units would experience substantially equal amounts of operation time.

As a further option, the pattern of operative fan units may only be switched for shorter "cycle" periods of time. For example, once each week, each month, each quarter, etc., the fan units that are normally OFF may be "cycled" by turning them ON, while at least a portion of the fan units that were otherwise ON are turned OFF. The fan units that are temporarily cycled ON may remain ON only for a short period of time (e.g., an hour, a day, etc.). Cycling fan units ON for short periods of time may be desirable to avoid damage, to the bearings and other parts of the motor and fan, that may result from remaining stationary for excessively long periods of time (e.g., to avoid flat spots forming on bearings).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A fan array comprising:
   a frame including a plurality of frame members, the frame members joined to define a plurality of chambers;
   a plurality of fan units, each fan unit configured to be positioned in one of the plurality of chambers, each fan unit having one motor;
   a plurality of local motor controllers joined to corresponding motors, the local motor controllers configured to control operation of the corresponding fan units; and
   a master controller configured to communicate with the local motor controllers, the master controller configured to provide the local motor controllers with target operating parameters for the corresponding fan units, wherein the local motor controllers calculate a target speed for the corresponding fan units based on the target operating parameters provided by the master controller.

2. The fan array of claim 1 further comprising a wire raceway to carry wires between the master controller and the local motor controllers.

3. The fan array of claim 1 further comprising at least one of a high voltage wire raceway to carry high voltage wires between the master controller and the local motor controllers and a low voltage wire raceway to carry low voltage wires between the master controller and the local motor controllers.

4. The fan array of claim 1, wherein the master controller and the local motor controllers wirelessly communicate.

5. The fan array of claim 1 further comprising a wire raceway to carry a low voltage wire between the master controller and the local motor controllers, the local motor controllers positioned within the wire raceway and electrically coupled to the low voltage wire.

6. The fan array of claim 1, wherein the master controller stores operating parameter settings for the plurality of fan units.

7. The fan array of claim 1, wherein each fan unit includes a sensor to detect properties of air flow through the fan unit, the properties of the air flow communicated to the corresponding local motor controller.

8. The fan array of claim 7, wherein the master controller stores sensor values for the sensor.

9. The fan array of claim 7, wherein the sensor is at least one of a local pressure sensor, a temperature sensor, a power draw sensor, a vibration sensor, or a noise sensor.

10. The fan array of claim 1, wherein the motor of each fan unit includes a sensor to detect properties of the motor, the properties of the motor communicated to the corresponding local motor controller.

11. The fan array of claim 1, wherein the local motor controllers calculate the target speed for the corresponding fan units based on at least one of an inlet cone pressure of the fan unit or an amperage of the motor.

12. The fan array of claim 1, wherein each motor includes a variable frequency drive that is controlled by the corresponding local motor controller based on the target operating parameters provided by the master controller.

13. The fan array of claim 1 further comprising a bus bar extending along at least one of the frame members to provide electrical signals to the fan units.

14. The fan array of claim 1 further comprising a bus bar configured to direct at least one of configuration commands, status requests, parameter settings, sensor values, or operating data between the master controller and the local motor controllers.

15. The fan array of claim 1, wherein the master controller and the local motor controllers communicate based on a pre-determined communications protocol.

16. The fan array of claim 1, wherein data packets containing at least one of commands or data are communicated between the master controller and the local motor controllers.

17. The fan array of claim 1, wherein the local motor controllers control the corresponding fan units based on data commands from the master controller.

18. The fan array of claim 1 further comprising a bus bar electrically coupled to the master controller, the local motor controllers configured to electrically couple to the bus bar to provide communication between the local motor controllers and the master controller.

19. The fan array of claim 1 further comprising a power line to power the fan units, communications capable of being transmitted over the power line.

20. The fan array of claim 1 further comprising:
an alignment mechanism located within each of the chambers in the frame; and
an attachment mechanism provided on each fan unit, the attachment mechanism corresponding to the alignment mechanism of the chamber, the attachment mechanism of the fan unit configured to engage the alignment mechanism of a chamber when the fan unit is positioned in a chamber of the frame, the alignment mechanism configured to align the fan unit within the frame.

21. The fan array of claim 1, wherein the frame includes an outlet and each fan unit includes a connector, the connector of the fan unit aligned with the outlet of the frame when the fan unit is positioned within a chamber in the frame.

22. The fan array of claim 1, wherein the frame includes an outlet and the fan units each include a connector, the connector of a fan unit engaged with the outlet of the frame when the fan unit is positioned within a chamber in the frame.

23. The fan array of claim 1, wherein the frame includes a latch and the fan unit includes an engagement mechanism configured to secure to the latch when the fan unit is positioned within a chamber of the frame.

24. The fan array of claim 1 further comprising a housing to retain a fan unit, the housing configured to be inserted within a chamber of the frame.

25. The fan array of claim 24 further comprising:
an alignment mechanism located within a chamber in the frame; and
an attachment mechanism provided on the housing, the attachment mechanism corresponding to the alignment mechanism of the chamber, the attachment mechanism of the housing configured to engage the alignment mechanism of a chamber when the housing is positioned in a chamber of the frame, the alignment mechanism configured to align the housing within the frame.

26. The fan array of claim 1 further comprising panels positioned within each chamber, the panels moveable between a closed position where the panel is positioned within the chamber and an open position where the panel extends from the chamber, a fan unit configured to be positioned on the panel.

27. A fan array comprising:
a frame including a plurality of frame members, the frame members joined to define a plurality of chambers;
a signal path joined to one of the frame members, the signal path having a plurality of outlets;
a plurality of fan units, each fan unit configured to be positioned in one of the plurality of chambers, each fan unit having one motor and a corresponding local motor controller that is configured to control an operation of the fan unit, the local motor controller configured to electrically couple to one of the outlets of the signal path;
a master controller electrically joined to signal path, the master controller providing to each local motor controller commands for each fan unit, wherein each local motor controller calculates a target speed for the corresponding fan unit based on the target operating parameters provided by the master controller.

28. The fan array of claim 27, wherein the signal path conveys parameter settings for the fan units between the master controller and the local motor controllers.

29. The fan array of claim 27 further comprising a bus manager to manage a sequence and a priority of communication between the master controller and the local motor controllers.

30. The fan array of claim 27 further comprising a transmitter to transmit data over the signal path.

31. The fan array of claim 27, wherein communication over the signal path is based on a pre-determined communications protocol.

32. The fan array of claim 27, wherein data packets containing commands and data are transmitted over the signal path in at least one of serial or parallel.

33. The fan array of claim 27, wherein the signal path directs at least one of power signals or data signals between the master controller and the local motor controllers.

34. The fan array of claim 27, wherein each fan unit includes a connector that is aligned with an outlet of the signal path when the fan unit is positioned within a chamber of the frame.

35. The fan array of claim 27, wherein each fan unit includes a connector that engages an outlet of the signal path when the fan unit is positioned within a chamber of the frame.

36. The fan array of claim 27, wherein each fan unit includes a sensor to detect properties of air flow through the fan unit, the properties of the air flow communicated to the corresponding local motor controller.

37. The fan array of claim 27, wherein the motor of each fan unit includes a sensor to detect properties of the motor, the properties of the motor communicated to the corresponding local motor controller.

38. The fan array of claim 27, wherein each local motor controller calculates the target speed for the corresponding fan unit based on at least one of an inlet cone pressure of the fan unit or an amperage of the motor.

39. The fan array of claim 27, wherein each motor includes a variable frequency drive that is controlled by the corresponding local motor controller based on the target operating parameters provided by the master controller.

40. The fan array of claim 27 further comprising a power line to power the fan units, communications capable of being transmitted over the power line.

41. The fan array of claim 27 further comprising:
an alignment mechanism located within each of the chambers in the frame; and
an attachment mechanism provided on each fan unit, the attachment mechanism corresponding to the alignment mechanism of the chamber, the attachment mechanism of the fan unit configured to engage the alignment mechanism of a chamber when the fan unit is positioned in a chamber of the frame, the alignment mechanism configured to align the fan unit within the frame.

42. A method of operating a fan array comprising:
positioning a plurality of fan units within chambers of a fan array frame;
electrically coupling a local motor controller of each fan unit to an outlet of a signal path provided on the fan array frame;
electrically joining a master controller to the signal path;
communicating commands for each fan unit between the master controller and the local motor controller; and
calculating with each local motor controller a target speed for the corresponding fan unit based on the target operating parameters provided by the master controller.

43. The method of claim 42 further comprising directing at least one of power signals or data signals across the signal path between the master controller and the local motor controllers.

44. The method of claim 42 further comprising transmitting at least one of configuration commands, status requests, parameter settings, sensor values, or operating data between the master controller and the local motor controllers.

45. The method of claim 42 further comprising transmitting data packets including commands and data between the master controller and the local motor controllers.

46. The method of claim 42 further comprising:
aligning a connector of each fan unit with an outlet of the signal path; and
engaging the outlet of the signal path with the connector of the fan unit when the fan unit is positioned within the chamber of the fan array frame.

47. The method of claim 42 further comprising:
detecting properties of air flow through the fan unit; and
communicating the properties of the air flow to the corresponding local motor controller.

48. The method of claim 42 further comprising:
detecting properties of the motor; and
communicating the properties of the motor to the corresponding local motor controller.

49. The method of claim 42 further comprising calculating with each local motor controller the target speed for the corresponding fan unit based on at least one of an inlet cone pressure of the fan unit or an amperage of the motor.

50. The method of claim 42 further comprising transmitting communications over a power line joined to the fan units.

51. A method of operating a fan array comprising:
positioning a plurality of fan units within a chamber of a fan array frame, wherein each of the plurality of fan units includes a fan, one motor, and a local motor controller;
controlling an operation of each fan unit with a respective one of the local motor controllers;
detecting properties of air flow through each fan unit with a sensor;
communicating target operating parameters for each fan unit to the respective one of the local motor controllers from a master controller; and
determining a target speed for each fan unit with the respective one of the local motor controllers based on the properties of the air flow through the fan unit and the target operating parameters.

52. The method of claim 51 further comprising:
extending a wire raceway across the fan array frame;
extending a wire through the wire raceway between the local motor controllers and the master controller; and
communicating between the master controller and the local motor controllers across the wire.

53. The method of claim 51 further comprising wirelessly communicating between the master controller and the local motor controllers.

54. The method of claim 51, wherein the sensor is positioned in an inlet cone of the fan unit.

55. The method of claim 51 further comprising:
detecting properties of a respective one of the motors of each fan unit; and
determining the target speed of each fan unit based on the properties of the respective one of the motors.

56. The method of claim 51 further comprising determining the target speed of a fan unit based on at least one of an inlet cone pressure of the fan unit or an amperage of one of the motors of the fan unit.

57. The method of claim 51 further comprising directing at least one of power signals or data signals between the master controller and the local motor controllers.

58. The method of claim 51 further comprising:
aligning a connector of each fan unit with an outlet of a signal path joined to the fan array frame; and
engaging the outlet of the signal path with the connector of the fan unit when the fan unit is positioned within a chamber of the fan array frame.

59. The method of claim 51 further comprising:
aligning a connector of each fan unit with a bus bar joined to the fan array frame; and engaging the bus bar with the connector of the fan unit to electrically couple the fan unit to the bus bar.

60. A fan unit comprising:
one or more frame members defining a chamber;
a motor within the chamber, the motor including a variable frequency drive;
a fan joined to the motor; and
a local motor controller joined to the motor,
wherein the local motor controller is configured to communicate with a master controller, wherein the master controller is configured to provide the local motor controller with target operating parameters, and wherein the local motor controller is configured to calculate a target speed for the fan based on the target operating parameters provided by the master controller.

61. The fan unit of claim 60, wherein the local motor controller is configured to communicate with the master controller based on a predetermined communications protocol.

62. The fan unit of claim 60, wherein the variable frequency drive is controlled by the local motor controller.

63. The fan unit of claim 60, wherein the local motor controller is within the chamber.

64. The fan unit of claim 60, wherein the master controller is remote from the local controller.

65. The fan unit of claim 60, wherein the master controller is physically secured to the one or more frame members.

66. The fan unit of claim 60, wherein the master controller is located within the chamber.

67. The fan unit of claim 60, further comprising a housing that retains one or more of the motor, the fan, or the local motor controller.

68. The fan unit of claim 67, wherein the housing is configured to be inserted within the chamber.

69. The fan unit of claim 60, wherein the local motor controller is not joined to any other motor.

70. The fan unit of claim 60, wherein the local motor controller is configured to operate the motor without operating any other motor.

71. A system comprising:
one or more frame members defining a plurality of chambers;
a plurality of motors, wherein each of the plurality of motors is within a respective one of the plurality of chambers, wherein each of the plurality of motors includes a variable frequency drive;
a plurality of fans, wherein each of the plurality of fans is joined to a respective one of the plurality of motors;
a plurality of local motor controllers, wherein each of the plurality of local motor controllers is operatively connected to a respective one of the plurality of plurality of motors; and
a master controller configured to communicate with the plurality of local motor controllers, wherein the master controller is configured to provide the plurality of local motor controllers with target operating parameters, wherein each of the plurality of local motor controllers calculates a target speed for a corresponding one of the fans based on the target operating parameters provided by the master controller.

72. The system of claim 71, wherein each of the local motor controllers is configured to communicate with the master controller based on a predetermined communications protocol.

73. The system of claim 71, wherein the variable frequency drive is controlled based on the target operating parameters provided by the master controller.

74. The system of claim 71, wherein each of the local motor controllers is within a respective one of the plurality of chambers.

75. The system of claim 71, wherein the master controller is remote from the plurality of local motor controllers.

76. The system of claim 71, wherein the master controller is physically secured to the one or more frame members.

77. The system of claim 71, wherein the master controller is located within at least one of the plurality of chambers.

* * * * *